US009269234B2

(12) United States Patent
Fredella et al.

(10) Patent No.: US 9,269,234 B2
(45) Date of Patent: Feb. 23, 2016

(54) KENO GAME METHOD AND APPARATUS WITH MULTIPLE CARD HIT REPLICATION

(71) Applicants: Bradley James Fredella, North Las Vegas, NV (US); Steven W Arntzen, Billings, MT (US)

(72) Inventors: Bradley James Fredella, North Las Vegas, NV (US); Steven W Arntzen, Billings, MT (US)

(73) Assignee: Century Gaming, Inc., Billings, MT (US)

( * ) Notice: Subject to any disclaimer, the term of this patent is extended or adjusted under 35 U.S.C. 154(b) by 191 days.

(21) Appl. No.: 14/073,558

(22) Filed: Nov. 6, 2013

(65) Prior Publication Data

US 2015/0126263 A1 May 7, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .................................. *G07F 17/3293* (2013.01)

(58) Field of Classification Search
USPC ........................ 463/18, 19, 20, 25, 39, 40, 42
See application file for complete search history.

(56) References Cited

U.S. PATENT DOCUMENTS

| | | | | |
|---|---|---|---|---|
| 5,823,873 | A | 10/1998 | Moody | |
| 6,007,066 | A | 12/1999 | Moody | |
| 6,098,985 | A | 8/2000 | Moody | |
| 6,315,291 | B1 | 11/2001 | Moody | |
| 6,364,313 | B1 | 4/2002 | Moody | |
| 6,517,074 | B1 | 2/2003 | Moody et al. | |
| 6,955,356 | B2 | 10/2005 | Moody | |
| 6,964,418 | B2 | 11/2005 | Moody | |
| 7,137,628 | B2 | 11/2006 | Moody | |
| 8,371,924 | B2 | 2/2013 | Meyer | |
| 2012/0122540 | A1 * | 5/2012 | Meyer | 463/19 |

* cited by examiner

*Primary Examiner* — Adetokunbo O Torimiro
(74) *Attorney, Agent, or Firm* — Brownstein Hyatt Farber Schreck, LLP

(57) ABSTRACT

A method and apparatus for playing keno on multiple cards with a two-draw cycle where hits from a first draw are replicated from a primary card to at least one secondary card while misses from a first draw are not replicated from the primary card to the at least one secondary card. An independent second draw for each card completes the game cycle resulting in different game outcomes based off the same first draw cycle. The player is awarded where appropriate for each game outcome on each of the cards played.

21 Claims, 19 Drawing Sheets

KENO GAME METHOD AND APPARATUS WITH MULTIPLE CARD HIT REPLICATION

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

The invention relates generally to keno games in live form or as played on an electronic gaming device. In electronic form, keno games are deployed on electronic gaming machines ("EGMs") for use in gaming establishments that are adapted to offer a variety of game types including slot games, video poker games, and other types of wagering games that are commonly deployed at a casino, the bar area of a restaurant, a convenience store or other location where EGMs are in operation for use by players. In particular, the keno game of the present invention permits a player to play multiple keno cards (or tickets) where the player replicates number selections from a primary or first game card into one or more secondary or later game cards. Any numbers selected in a first draw cycle that match those selected by the player are replicated on each of the secondary cards prior to a second draw cycle taking place.

Keno is a standard wagering game where a pool of numbers (usually 80) is used. In live keno, each number in the pool of numbers is represented on a ball in a set of balls which are placed in an enclosure and then selected at random one at time. Once a ball is drawn from the pool it is removed until the end of the game. The selected balls form a set of winning numbers.

There are typically 20 balls drawn from the full set of 80 balls. Players wager on the balls to be chosen by marking the numbers or "spots" on a keno card or ticket. The keno tickets are usually preprinted with a 10×8 matrix of numbered spots from 1 to 80. The player may mark any number of spots up to 20 with the probability of hitting the selected numbers decreasing as the number of selections increases all the way up to the maximum. The player turns in his card to a keno station where he receives a receipt showing the numbers selected and the amount of the wager. After all players submit their wager, the balls are drawn one by one and the players watch the drawing to determine how many "hits" they get from their particular group of selected spots. Once all 20 numbers are drawn, the player is paid on his wager based on an established paytable for the total correct spots selected. Each casino may offer different paytables for the drawing as well as specialty keno bets that may be based on the order of the selected numbers, the pattern of the selections on the card or any number of other variants. Many casinos also pay where a player selects 20 spots and none of the spots are registered as hits. In a live version of the game, any number of players may place a wager and participate in the game. There may be no winners or there may be multiple winners, each being paid according to the established paytable. The term "catch" is used to describe a winning ticket with the total number of hits on that ticket.

Keno paytables are based on the probabilities of a particular number of hits for a game which varies depending on the number of spots initially marked by the player. For example, in a 20 ball draw with 20 spots marked by the player, the number of hits to the odds of successfully catching the number of hits is as follows:

| Hits | Odds |
|---|---|
| 0 | 1 in 843.380 (0.11857057%) |
| 1 | 1 in 86.446 (1.15678605%) |
| 2 | 1 in 20.115 (4.97142576%) |
| 3 | 1 in 8.009 (12.48637168%) |
| 4 | 1 in 4.877 (20.50318987%) |
| 5 | 1 in 4.267 (23.32607380%) |
| 6 | 1 in 5.258 (19.01745147%) |
| 7 | 1 in 6.826 (11.32954556%) |
| 8 | 1 in 20.055 (4.98618021%) |
| 9 | 1 in 61.420 (1.62814048%) |
| 10 | 1 in 253.801 (0.39401000%) |
| 11 | 1 in 1,423.822 (0.07023351%) |
| 12 | 1 in 10,968.701 (0.00911685%) |
| 13 | 1 in 118,084.920 (0.00064685%) |
| 14 | 1 in 1,821,881.628 (0.00005489%) |
| 15 | 1 in 41,751,453.986 (0.00000240%) |
| 16 | 1 in 1,496,372,110.872 (0.00000007%) |
| 17 | 1 in 90,624,035,964.712 |
| 18 | 1 in 10,512,388,171,906.553 |
| 19 | 1 in 2,946,096,785,176,811.500 |
| 20 | 1 in 3,535,316,142,212,173,800.000 |

As can be seen in this table[1], the probability of hitting 5 of 20 is the highest among the 20 possible numbers available. Typical casino paytables reflect this fact paying a small amount for a low number of hits with escalating payouts for greater numbers of hits. Despite the fact that it is difficult to get "0" or "1" hits, most casino paytables start payouts at a certain number of hits and escalate the payout for a greater number of hits. For example, if five spots are marked, the player will be paid an increasing amount for each of 3, 4 or 5 hits, but not for 0, 1 or 2 hits. Marking ten spots may only pay an award for 5 or more hits. Any card with four or less pays nothing.

[1] Wikipedia—http://en.wikipedia.org/wiki/Keno

In an electronic version of keno, a single player plays against an EGM. Play on the EGMs typically requires the player to place a wager on the outcome of a random selection of spots on a card where the card is represented as a video image on the display of the EGM. An example of a prior art keno game on a video screen 105 is shown in FIG. 1A. A game card 10 with spots numbered 1-80 is shown in a 10×8 matrix. The player chooses his spots using the touchscreen controls on the EGM display. The games are programmed with a random number generator ("RNG"; see FIG. 3) to randomly generate outcomes and compare those outcomes to a predefined set of possible winning combinations and paytable amounts. The player is awarded for a winning outcome and receives no award for a losing outcome.

In a keno game shown in the example of FIG. 1A, a player may mark up to 15 spots by touching the numbered places or spots on the screen. To unmark a spot that has been mistakenly selected, the player need only touch the marked spot again. Marked spots are highlighted as shown in FIG. 1B which shows game card 10 after the player has completed the spot selection process. It is possible for a player to make a "quick pick" for his any number of spot selections by using the "quick pick" buttons 35 in which case the EGM will automatically pick the selected number of random spots from the 80 shown.

As spots are marked, table 15 is updated to reflect the appropriate paytable for the number of picks selected. In the example game shown in FIGS. 1A-1C, the player picks 15 numbers and has the opportunity to win a prize ranging from $2 for picking 6 correct numbers up to $1 million for picking 15 correct numbers. Once all 15 spots have been selected by the player, the spots are locked in and the EGM begins the process of selecting the winning numbers.

FIG. 1C is a screenshot of display 105 after completion of the game where 20 balls are shown below matrix 10 representing the winning numbers. As each number is picked, a ball with that number enters screen 105 on the right side and rolls across to the left until it stops next to any previously selected balls. For each number selected that matches a player selection, a hit is recorded on game card 10 by showing a highlighted circle around the number. Numbers selected that do not match a player selection are shown with an "X" on card 10. At the bottom of screen 105, a number of meters and game play buttons appear in an information bar 17 including a balance meter 25, a wager amount 30 that can be increased or decreased using arrows 30*u* and 30*d*, a quick pick selector area 35 which lets any number of quick picks numbers be selected from 1 to 15, a clear button 40 for clearing a card where the player wants to reselect numbers, a repeat button 45 which lets the player repeat number selections from a previous game, a play button 50, an auto-play button 55 which lets the player play multiple games without manually selecting until the balance is used up, and a win meter 60 for showing the winning amount for a game card after play of a game has been completed.

There are different variations of keno that are available on an EGM. In Nevada, keno games always have a minimum draw of 20 numbers and the number of player selected picks is usually limited to a maximum of 10. There are also many variations in how the game is played. For example, there is a game known as Four Card keno in which the player plays four cards simultaneously in the same game. The player may select a different set of spots for each of the four cards. After the wager is placed, a 20 number draw is made and applied to each of the four cards. Each of the four cards is then evaluated to determine if it is a winner based on the number of spots hit (or caught) on each card. If so, the player is paid an award. By playing four cards in the same game, the player has an increased likelihood of having at least one winning card during each 20 number draw, and possibly up to four winning cards on a single 20 number draw.

Other keno variants are also known such as a "way" ticket. Using a way ticket, a player may play multiple spots on multiple cards with predefined groupings of winning numbers. For example, a seven way ticket may be used across three groupings (e.g. Group I, Group II and Group III) of spots of three spots each. The player places seven wagers and is eligible to paid winnings if the any of the groupings are winners: (1) all three spots in Group I; (2) all three spots in Group II; (3) all three spots in Group III; (4) six spots including Group I and Group II; (5) six spots including Group I and Group III; (6) six spots including Group II and Group III; and (7) nine spots including Group I, Group II and Group III. There are multiple variations of way ticket games and any particular way ticket design is at the discretion of the designer.

Historically, the variations of game play for keno has been appealing to players even though there are typically more losing cards than winning cards. As with all wagering games, the game designers and operators of keno games are always striving to find appealing features and game functionality that will generate player excitement and increase, or at least maintain the interest of the player. This is particularly important for a player who has a group of numbers that he believes is lucky or that is due for a hit.

The present invention defines a method of game play and an apparatus that provides more excitement and maintains the interest of the player in the play of keno games. It does so by offering an opportunity to replicate hits from one keno card to one or more additional keno cards wagered on by the player. Like other keno games played in a live format or on an EGM, the player places an initial wager to play. The player selects a set of numbers to play. A random number generator ("RNG") generates a series of outcomes for a particular game that corresponds to a set of selected winning numbers for that game. The player selected numbers are then compared to the selected winning numbers for each marked on a play card. In the event the marked numbers match enough of the selected winning numbers to produce a winning card, the player is awarded a prize in accordance with the paytable. The present invention makes the game more fun and exciting by replicating one or more hits from a primary or first card available for play onto one or more secondary or later cards. The player's probability of a win on the later cards increases because one or more hits are automatically preset on the later cards. This generates more excitement for the player during game play.

BRIEF DESCRIPTION OF THE DRAWINGS

For a better understanding of the present invention, and to show more clearly how it functions, reference will now be made, by way of example, to the accompanying figures. The figures show embodiments of the present invention in which.

DETAILED DESCRIPTION OF THE INVENTION

Figure 1A:
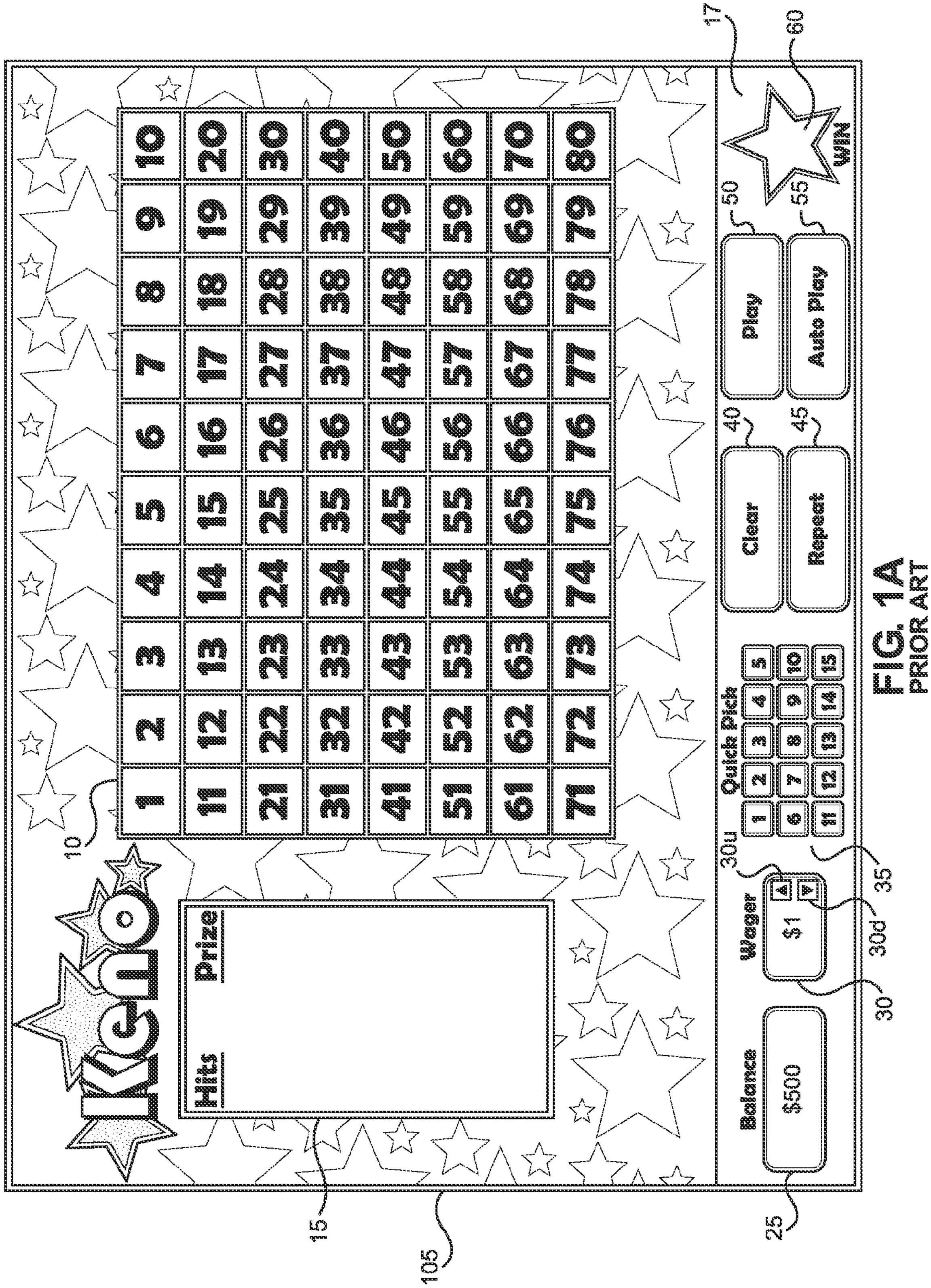
FIG. 1A PRIOR ART
FIGS. 1A-1C show a game screen on an electronic gaming machine for playing a prior art keno game.

The present invention will now be described more fully with reference to the accompanying figures. It should be understood that the invention may be embodied in many different forms and should not be construed as limited to the embodiments set forth herein. Throughout FIGS. 1-7, like elements of the invention are referred to by the same reference numerals for consistency purposes.

Figure 2A:
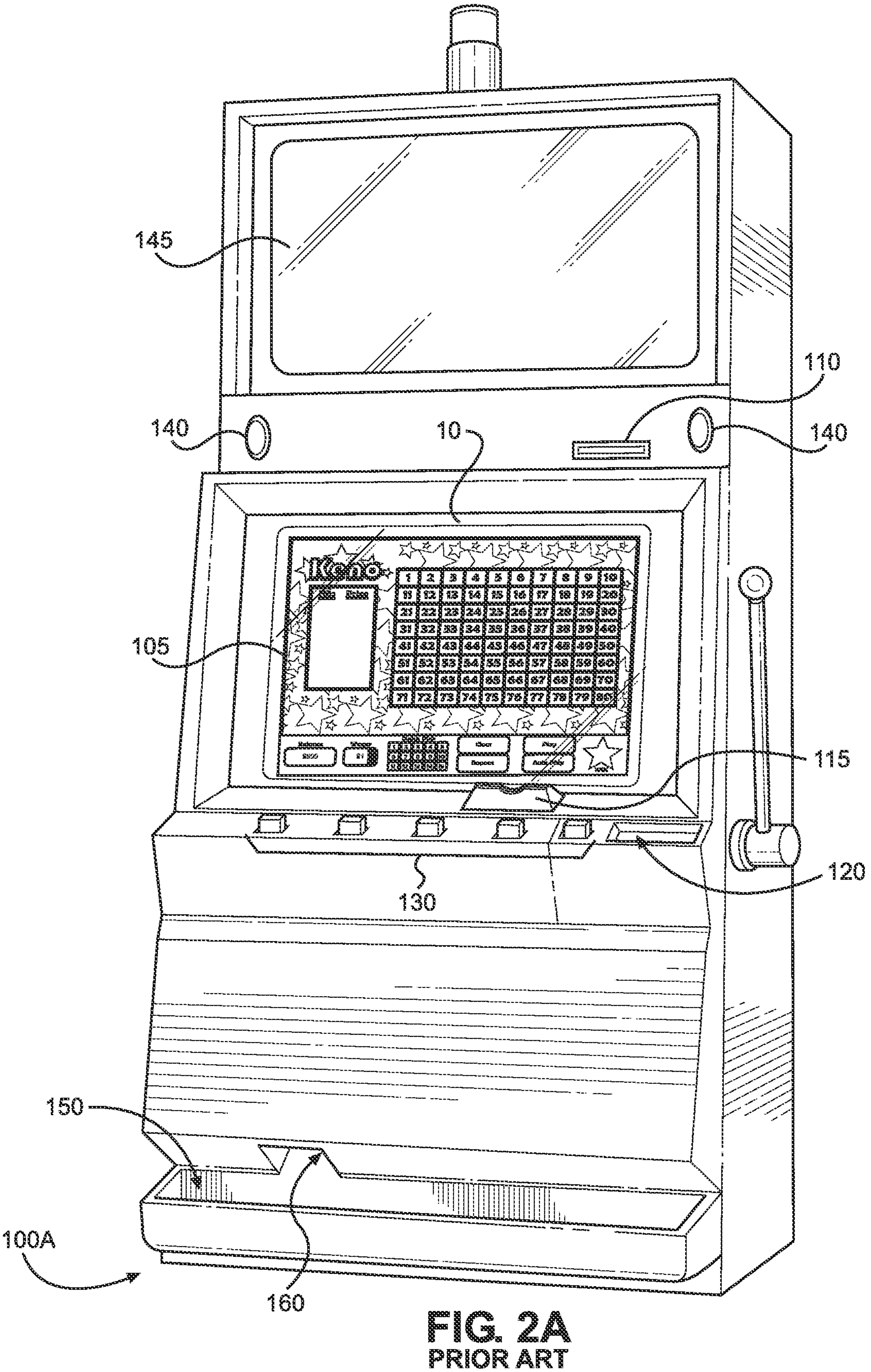
FIG. 2A PRIOR ART
FIGS. 2A-2G show prior art computing devices for playing a keno game.

FIG. 2A shows a prior art electronic gaming machine ("EGM") 100A for playing keno with a number of components. A video touchscreen display 105 is used to show game play and resulting outcomes. A player tracking card reader 110 may be included to track play for a particular player. Touch screen displays are included on most EGMs and provide a flexible interface for operation of EGM 100A, including displaying symbols on game card 10 during play. Other components include a bill validator (see FIG. 3). Older EGMs also include a coin acceptor (see FIGS. 2A-2B), although coin acceptors are no longer widely used in new EGMs. Both the bill validator and coin acceptor are housed inside EGM 100A into which bills may be inserted through bill slot 120 and coins may be inserted through coin head 115, respectively. Buttons 130 on the exterior of EGM 100A are used to control certain EGM operations in conjunction with touch screen display 105. Speakers 140 are used to provide sounds in conjunction with game play and other EGM operations.

Figure 1B:
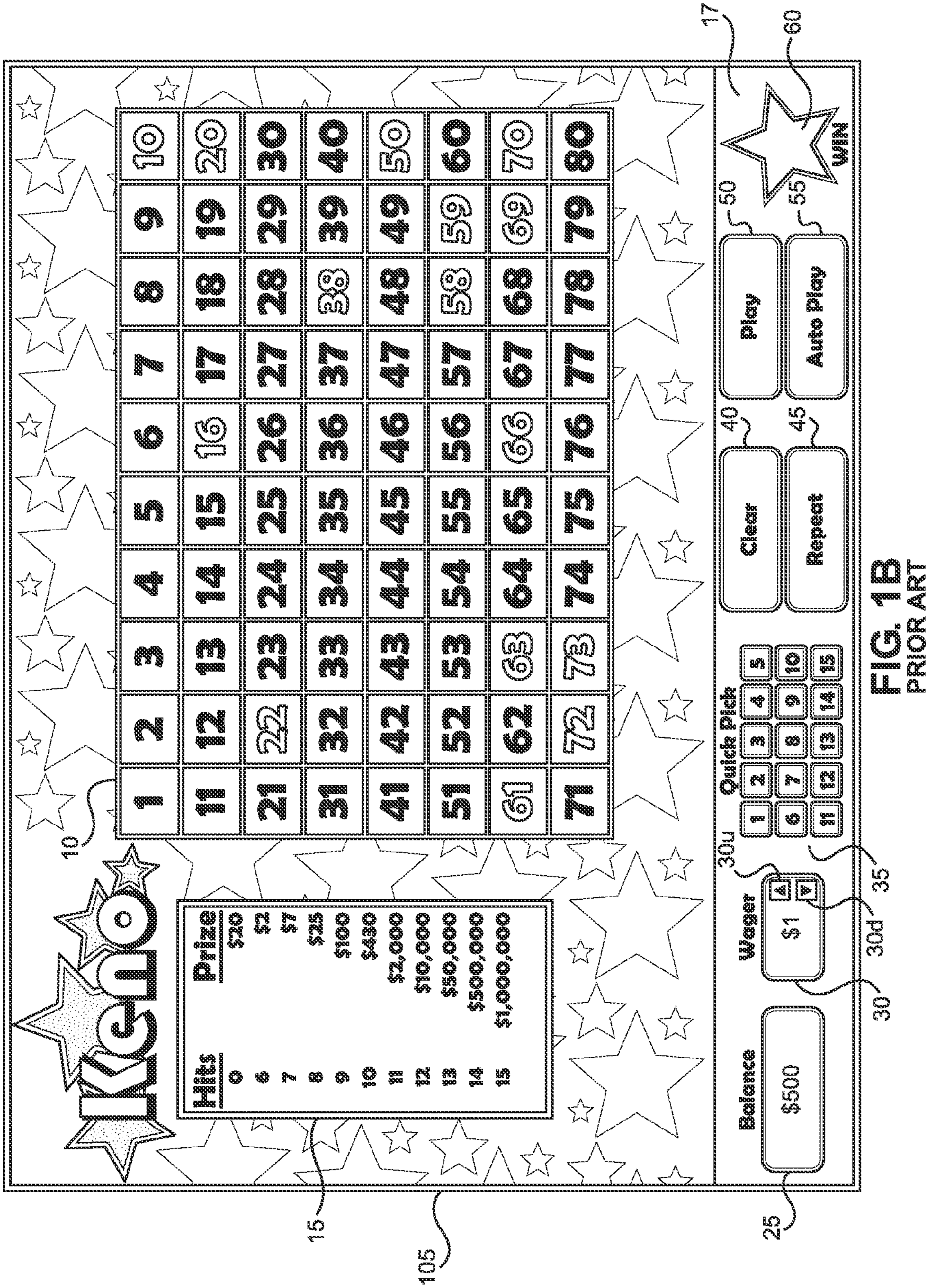
FIG. 1B PRIOR ART
Figure 1C:
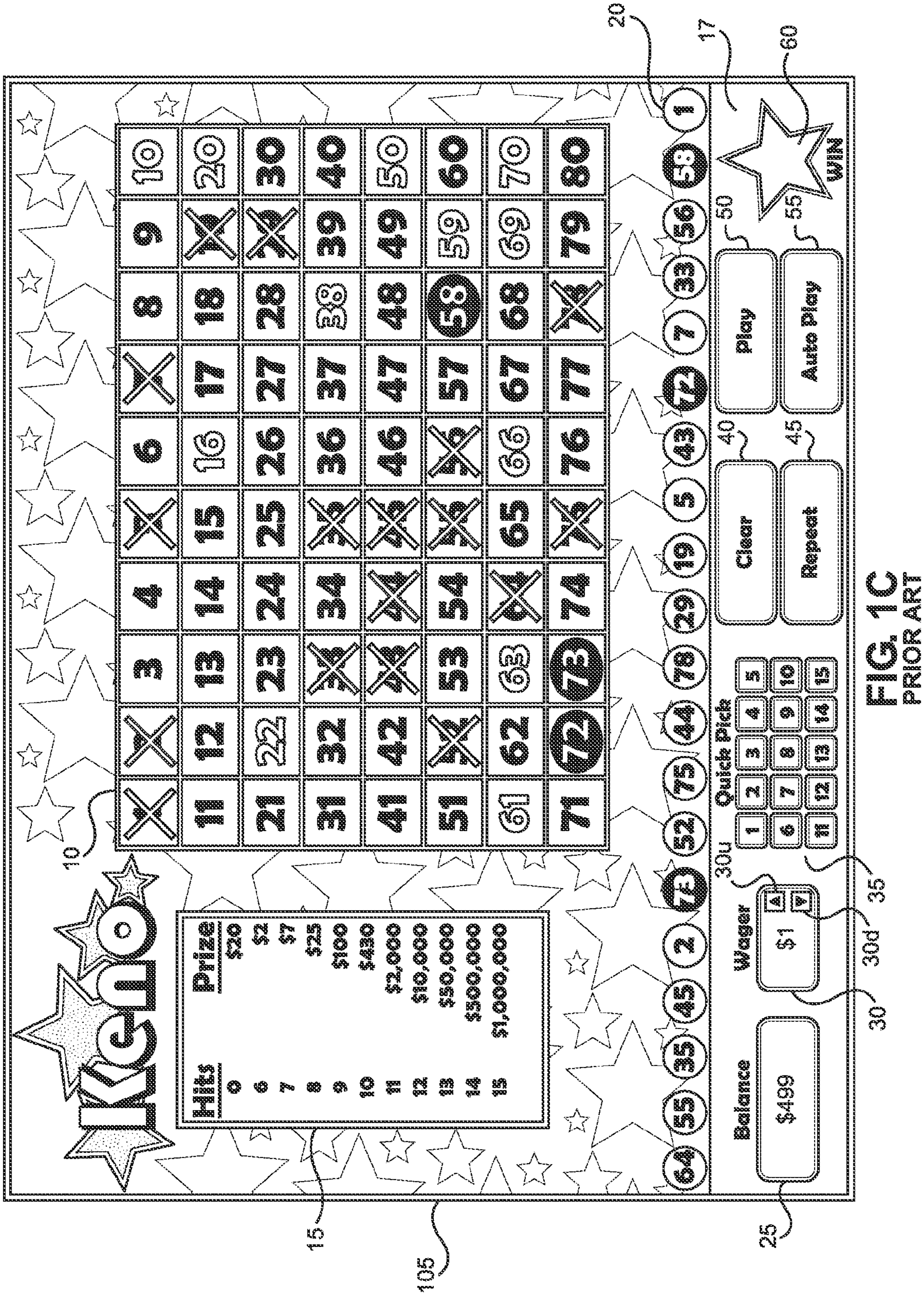
FIG. 1C PRIOR ART

EGMs further include a top box 145 for displaying paytables, artwork, advertising or other types of information either on fixed glass or on other displays such as an integrated video panel or touchscreen. Top box 145 may be fitted with a liquid crystal display ("LCD") screen to permit aspects of game play from either a base game or a secondary game to be shown in top box 145. Meters and other buttons for play operation as shown in FIGS. 1A-1C are positioned near the bottom of screen 105. For machines capable of accepting coins, a coin tray 150 at the bottom of EGM 100A is used to catch coins as they are dispensed to a player. It is also common for EGM 100A to include a ticket-in, ticket-out ("TITO") component that may be part of the bill validator housed inside of EGM 100A that may accept bar coded credits through slot 120 and for which the value of the credits is displayed on meter 25 upon a ticket being inserted.

Figure 2B:
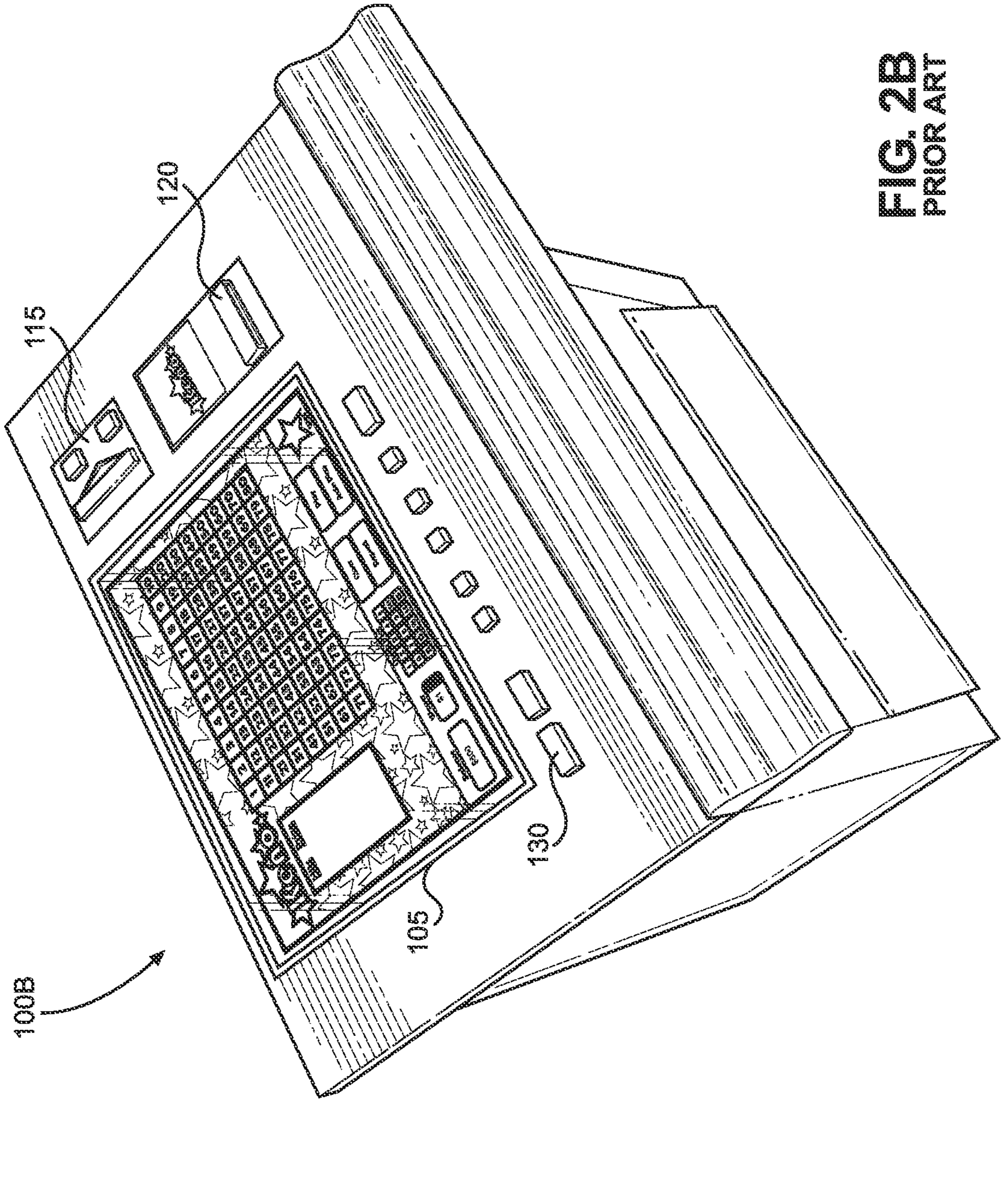
FIG. 2B PRIOR ART
Figure 2C:
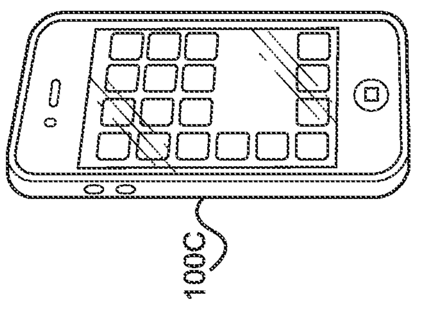
FIG. 2C PRIOR ART

FIG. 2B shows a prior art EGM in the form of a bar-top video keno machine 100B with a touchscreen for playing one or more keno games. Bar-top EGMs 100B of the type shown in FIG. 2B are used extensively in bars or bar-top counters. Operation of a bar-top EGM 100B of the type in FIG. 2B is the same as that for the EGM of FIG. 2A where a random number generator is used to select a random number that is correlated to a game outcome that is shown on display 105. It should be understood that any reference to an EGM 100 herein applies to any EGM including a stand up EGM of the type shown in FIG. 2A and referenced as 100A and/or the bar top EGM of the type shown in FIG. 2B and referenced as 100B, as well as any other EGM of differing formats on which a player plays a game.

Figure 2D:
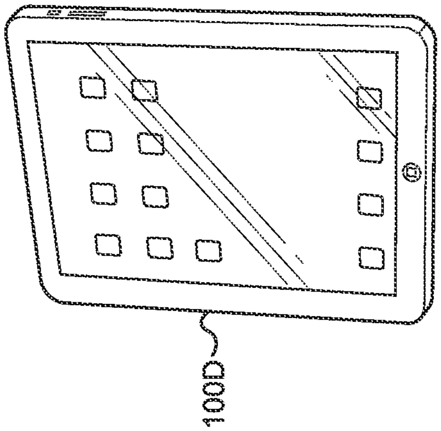
FIG. 2D PRIOR ART
Figure 2E:
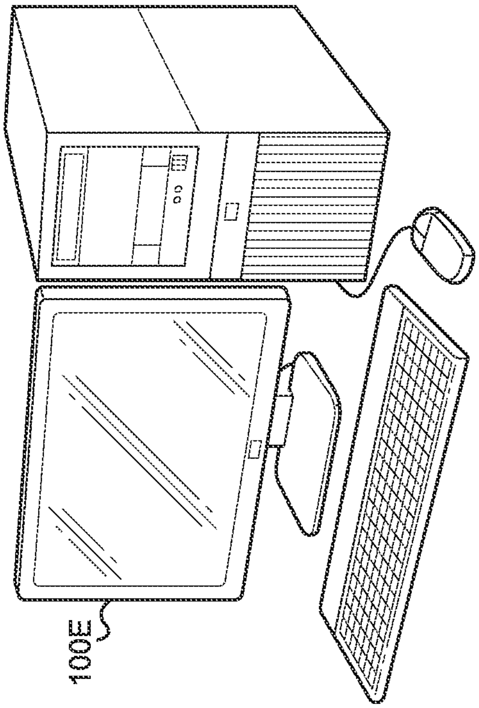
FIG. 2E PRIOR ART
Figure 2F:
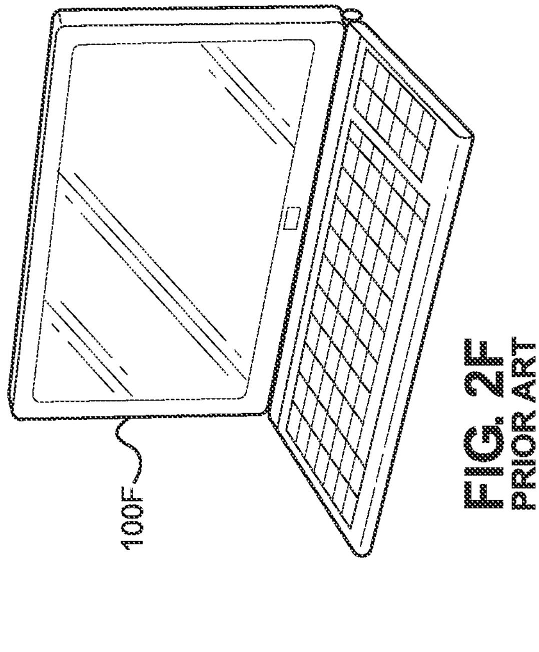
FIG. 2F PRIOR ART
Figure 2G:
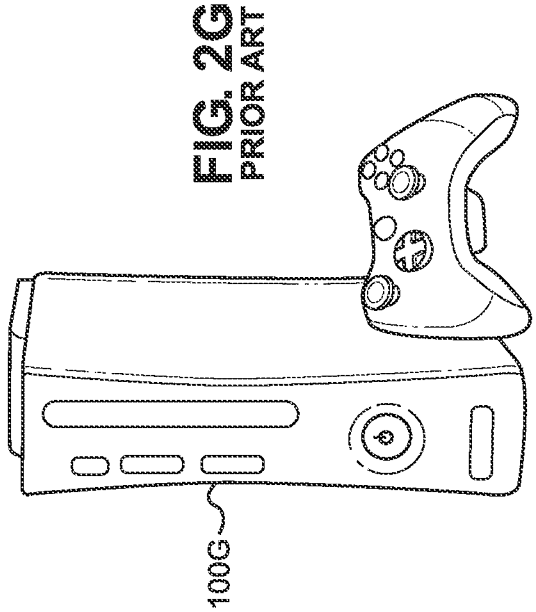
FIG. 2G PRIOR ART

FIGS. 2C-2G show a number of general purpose computing devices which may be used to play a game. These figures show a smartphone 100C in FIG. 2C which may be an Apple iPhone 4S® as pictured, or any other mobile phone type device. A tablet computer 100D is shown in FIG. 2D which may be an Apple iPad 3® as pictured, or any other tablet computing device. A desktop computer 100E is shown in FIG. 2E which may be a Lenovo® machine as pictured, or any other desktop computer. A laptop computer 100F is shown in FIG. 2F which may be a Lenovo® computer or any other laptop computer. And, a home video gaming device 100G is shown in FIG. 2G which may be a Microsoft Xbox® system or any other home video system. Other types of network connected devices could also be used to play games including portable video gaming devices such as a Sony PSP®, a Nintendo GameBoy®, or an internet connected television with a browser or app capabilities. Any of these devices is capable of playing a game, including a wagering game, through an app loaded onto the device or through a website accessible using a browser on the device. In the case of the networked game, payment may be made by credit card, Paypal® or another payment service. The RNG is run securely on server based system 305 (see FIG. 3) and then delivers the outcomes over the internet to be displayed on the general purpose computing device. It should also be understood that the game may be played for fun without a wager, or using promotional or "fun" credits that do not have monetary value.

Figure 3:
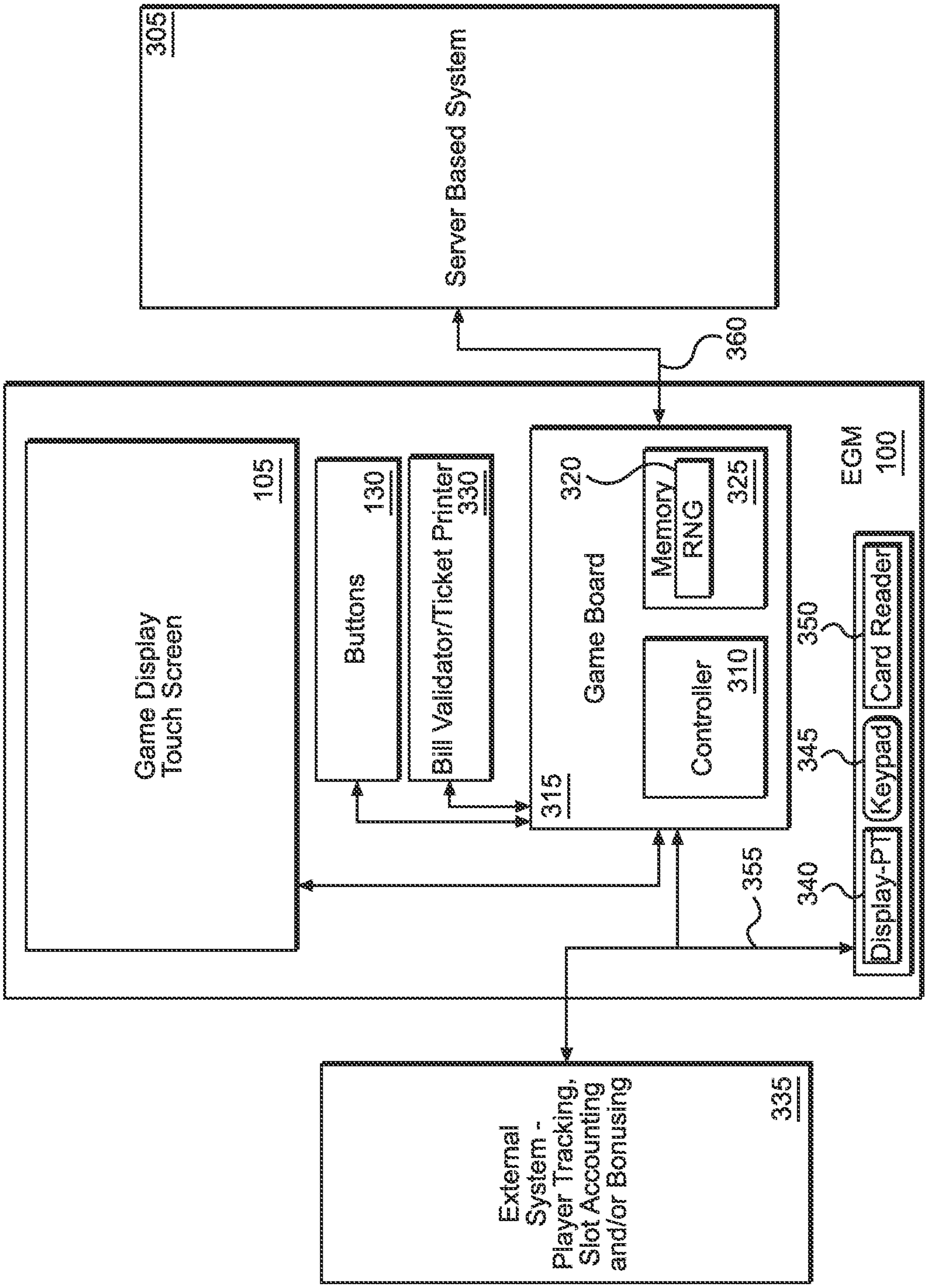
FIG. 3 PRIOR ART
FIG. 3 shows a prior art electronic gaming machine for playing a keno game and connected to a network controlled by a server based system.

FIG. 3 is a block diagram of EGM 100 connected to a server based system 305 and showing certain internal components of EGM 100. All operational functions of EGM 100 are controlled by a controller 310 such as a microprocessor housed inside EGM 100 that is resident on a game board 315. Controller 310 executes instructions that include operation of a random number generator 320 ("RNG") that is usually implemented in software and stored in a memory 325. The internal components of EGM 100 are well known to those of ordinary skill in the art. Game outcomes are determined based on the results corresponding to the numbers selected by RNG 325. A bill validator 330 may also have ticket printing capabilities or a separate ticket printer may be included. Bill validator 330 accepts currency in the form of bills, or tickets from a player and adds credit to the meters on display 105 on EGM 100. At cash-out, a ticket is printed indicating the cash-out amount and including a security code which is typically in the form of a barcode stored on server based system 305 or external system 335.

An external system 335 such as a player tracking system, a slot accounting system or a bonusing system may also be connected to EGM 100. These types of systems are typically connected to EGM 100 either through a separate interface board (not shown) or directly integrated with different components of EGM 100 including but not limited to game board 315. A player tracking system may also include other components installed on EGM 100 such as a player tracking display 340, a keypad 345 and a card reader 350. These components allow for direct interaction between external system 335 and the player to receive information from the player on keypad 345 or through information on a card inserted into card reader 350, and to display information to the player on display 340. A network is established between external system 335 and EGM 100 by network connection 355. The network may be connected to all EGMs 100 in a casino or any smaller subset of EGMs 100.

Server based system 305 is also connected to EGMs 100 by a network connection 360 which may be a separate connection or on a connection to the same network as external system 335. Server based system 305 may have one or more individual servers tasked with different functions such as communicating with a player at EGM 100 to fulfill requests, delivering services such as television shows or other content, or a host of other information.

In FIG. 3, EGM 100 is shown as a casino gaming device of the type depicted in either FIG. 2A or FIG. 2B. It should be understood that any one or more of the general purpose computing devices—smartphone 100C, tablet computer 100D, desktop computer 100E, laptop computer 100F, or home video gaming system 100G shown in FIGS. 2C-2G—could be placed on a network connected to server based system 305. For purposes of this specification, reference to one or more EGMs 100 in an environment using a limited access intranet of the type typically found in a casino would also apply to one or more general purpose computing devices with a secure connection to a server over the internet and not involving a physical casino property at all, and which may or may not require a wager or payment to play.

It will be understood that the type of network over which data is communicated can be one of several different types of networks including a Local Area Network (LAN), Wide Area Network (WAN), an intranet or the Internet. Other proprietary networks could also be used without departing from the principles of the invention. This would include such networks as a Windows network or an Ethernet network.

Figure 4A:
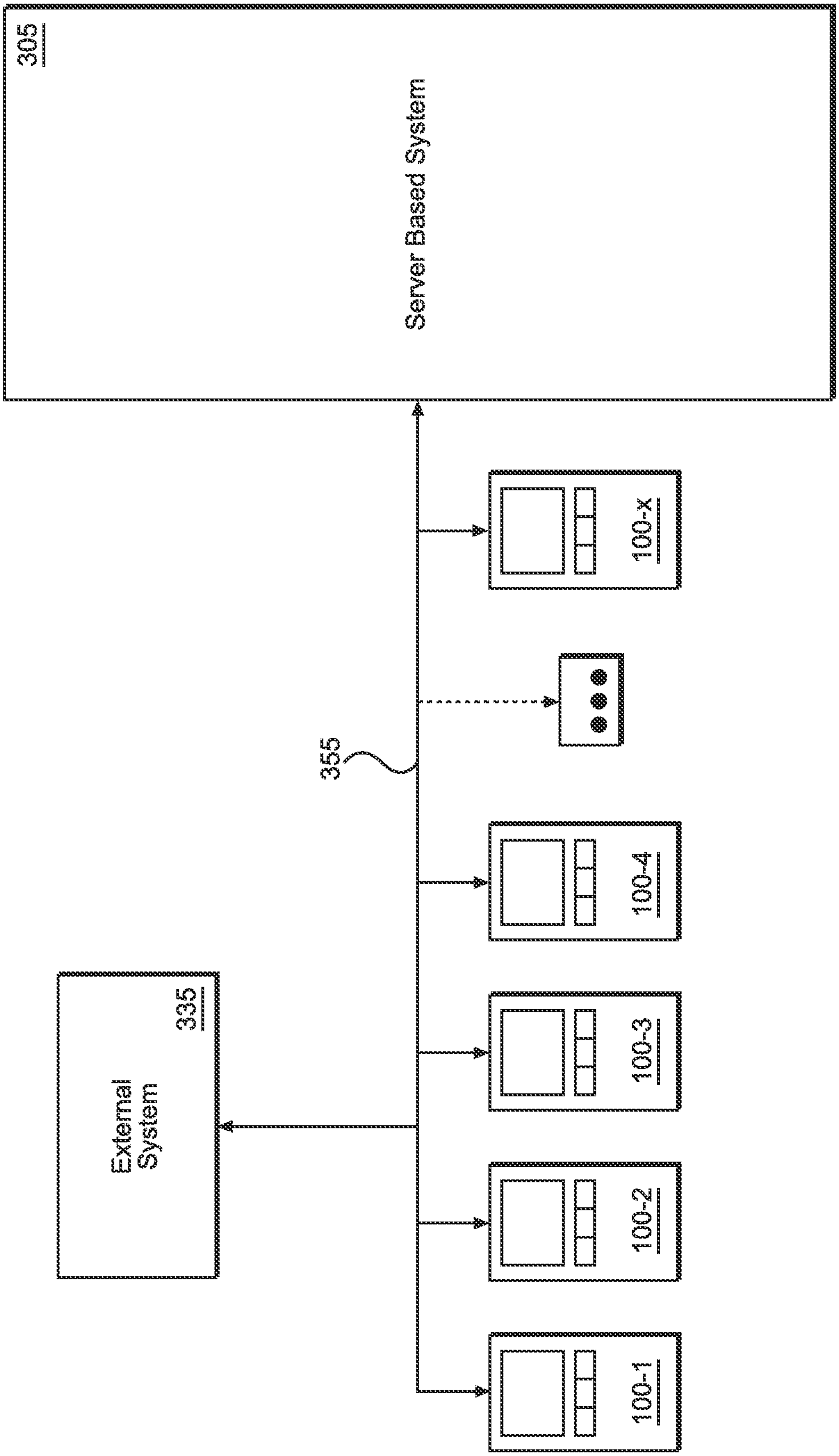
FIG. 4A PRIOR ART
FIGS. 4A-4B show a group of prior art electronic gaming machines on a network connected to a server based system and an external system.

FIG. 4A is a block diagram showing a group of EGMs 100 1-x on a network connection 355 between server based system 305 and each of EGMs 100 1-x. It should be understood that the network may be set up with any number of EGMs that may number into the thousands of machines. Each of EGMs

100 1-x is also connected to external system 335 that may be a player tracking, slot accounting, bonusing or other type of system. Information is communicated between EGMs 100 and server based system 305.

Figure 4B:
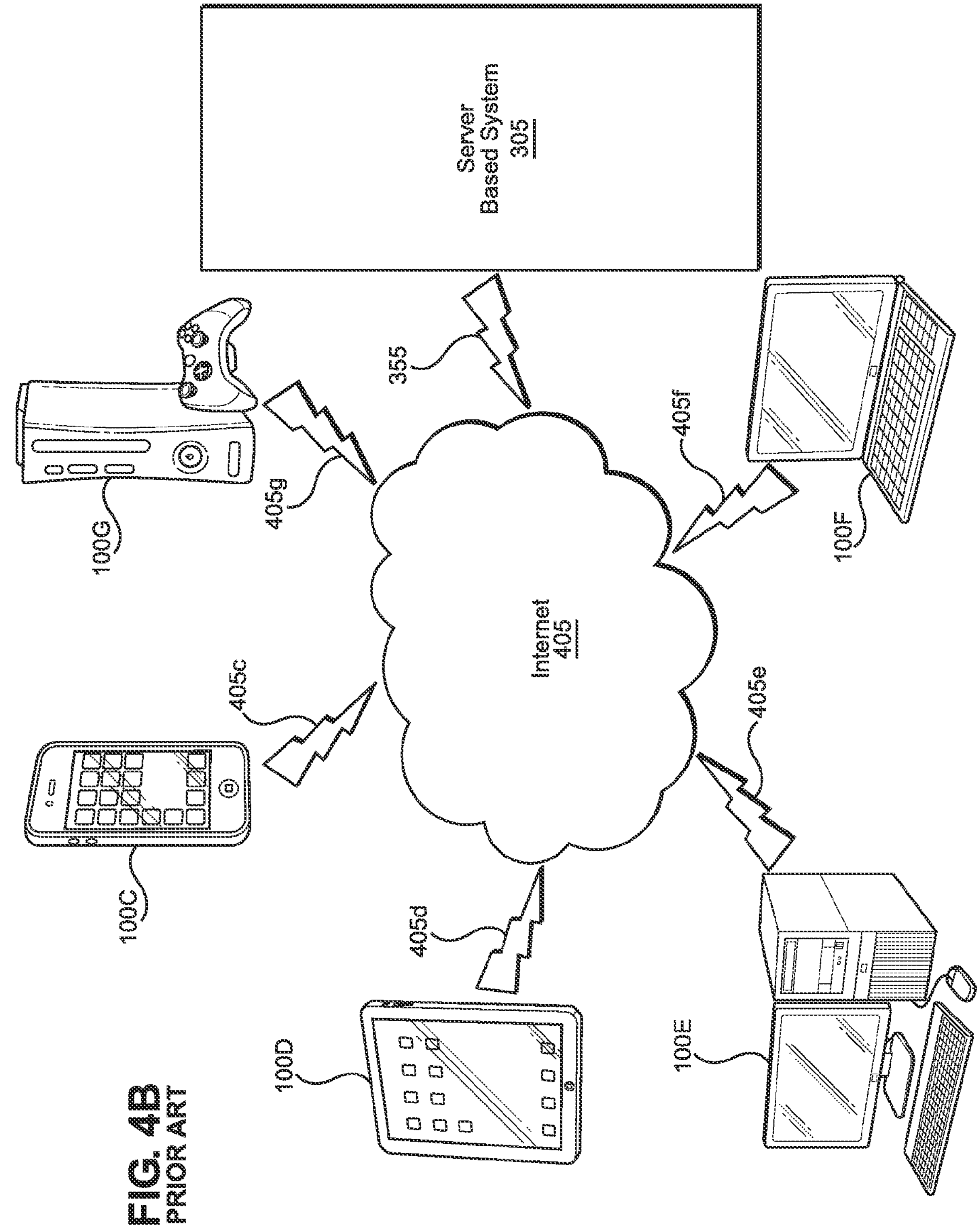
FIG. 4B PRIOR ART

FIG. 4B shows server based system 305 connected to a network with multiple computing devices for playing games. It should be understood that the network shown in FIG. 4B operates in the same manner as the network of FIG. 4A, except that the computing devices on the network of FIG. 4B are connected over the internet 405 with each device 100C-100G connected over a secure connection 405_c-g_ to server based system 305 which connects to the internet over network connection 355. Payments can be made securely over internet 405 using connections 405_c-g_, and then delivered to an operator of server based system 305 over connection 355. Similarly, the keno game is executed on server based system 305 using a secure RNG with the outcomes being delivered to the individual devices 100C-G over internet 405. Alternatively, the game software or a portion of it may be resident and executed on each device 10C-G. Wagers by players and payments to players may be made using accounts set up with an operator of a website on which the games are run.

Figure 5A:
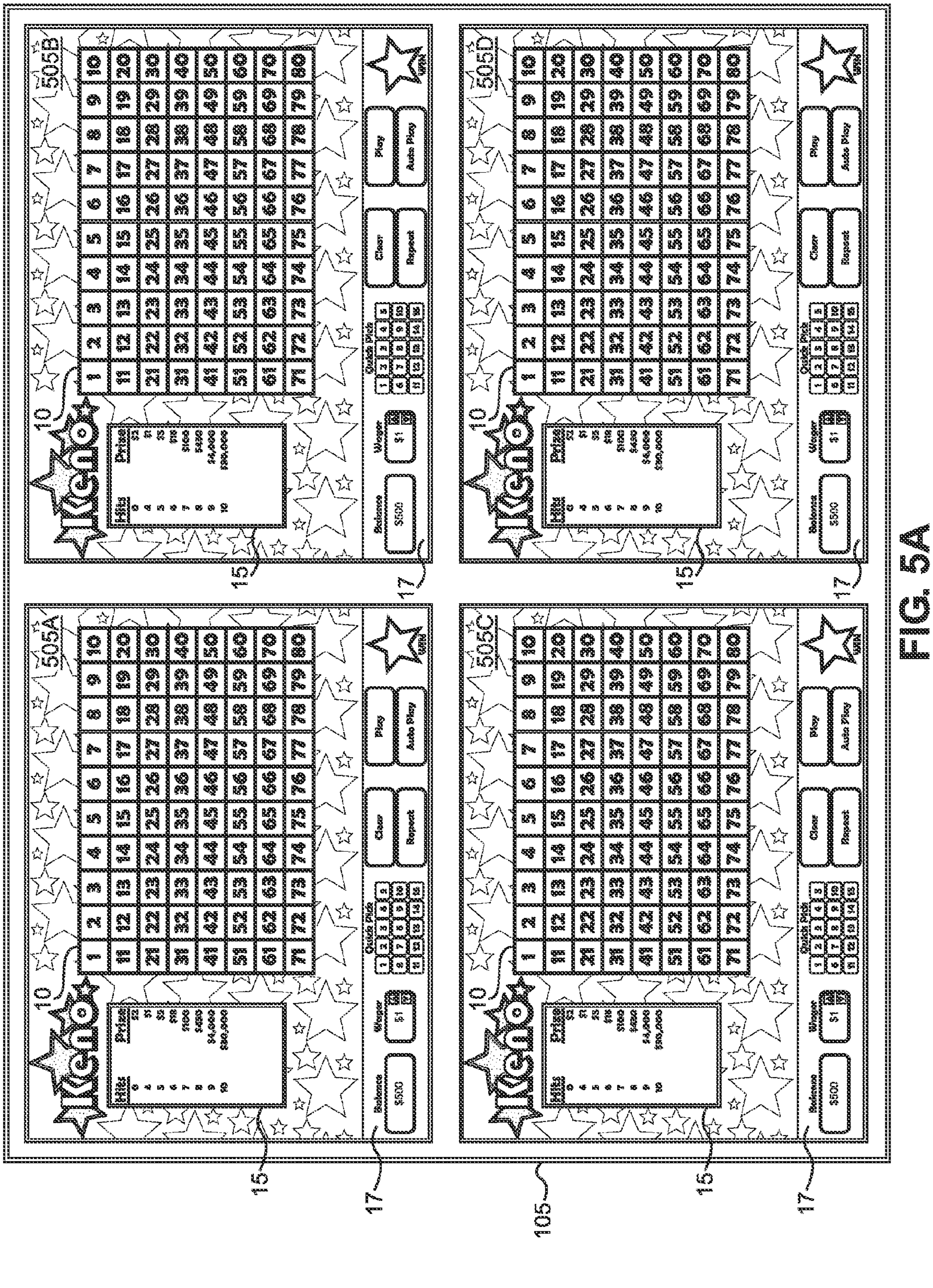
FIGS. 5A-5H show a sample sequence of game screens of a multi-card keno game in accordance with the present invention.
Figure 5B:
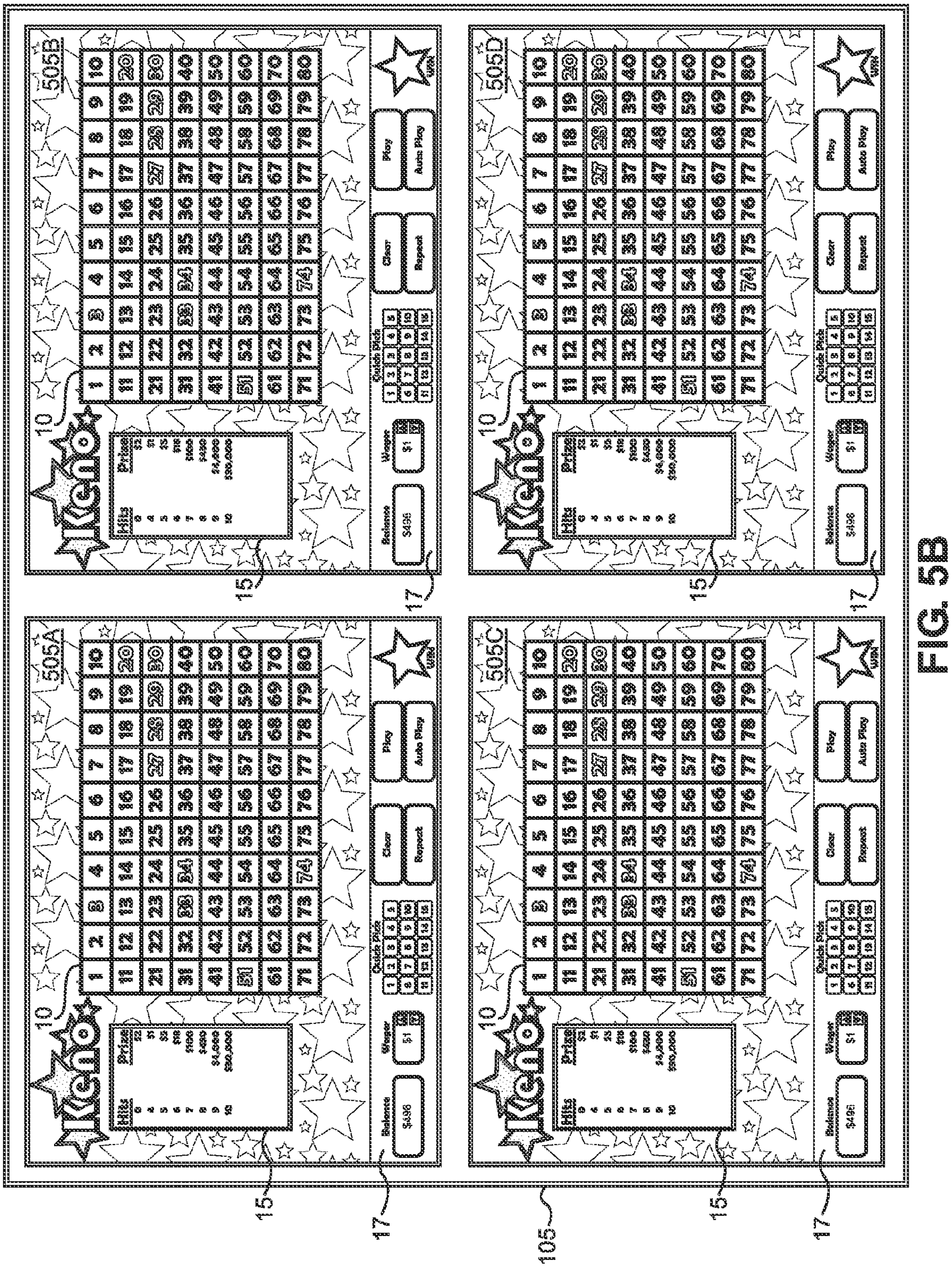
Figure 5C:
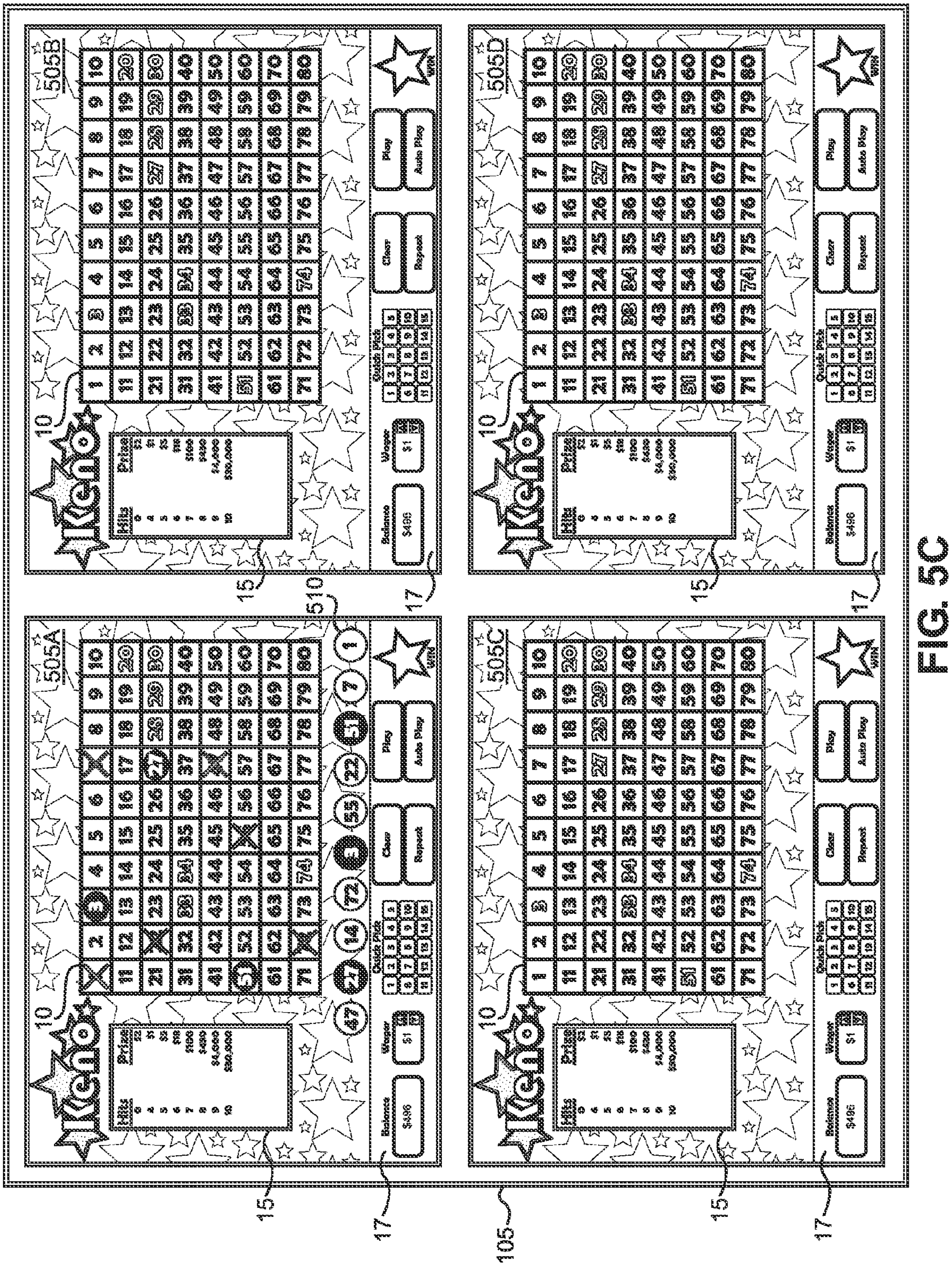

FIG. 5A shows display 105 of EGM 100 with a set of four keno play cards 505A-D. The operation of EGM 100 as it performs the keno game operations of the present invention will now be described with respect to the screenshots of FIGS. 5A-5H and the flow chart 600 of FIG. 6. A player initially sits down at EGM 100 to start play of a keno game as indicated at step 605. The player first operates EGM 100 using buttons 130 and/or touchscreen display 105 at step 610 to select the number of keno game cards to play. Each keno play card 505 is the same as an individual standard play card 10 in the prior art as shown in FIGS. 1A-1C. A wager of the same amount is placed at step 615 for each of the game cards to be played as part of the game cycle. It should be understood that the player could wager different amounts on each card by using the wager up button 30_u_ and wager down button 30_d_ to adjust the amount, but for purposes of simplicity in this description, the wager on all of cards 505A-D are the same. The player then determines how many spots to play at step 620 and then selects the particular spots to play at step 625 on a first play card 505A using touchscreen 105 in a manner similar to that used for a standard keno game. Player marked spots on matrix 10 of primary card 505A are indicated by highlighting of the marked numbers.

In one embodiment of the game sequence shown in the example screenshots of FIGS. 5A-5H, the player has decided to play a four card game with 10 selected spots. Once selected on primary card 505A at step 625, each of the 10 selected spots are replicated at step 630 in each secondary card wagered on by the player. As with primary card 505A, the player marked spots are highlighted on each of secondary cards 505B-D wagered on by the player. Once the selections are locked in, play on the primary card 505A begins. Unlike a standard keno game, the present invention uses two separate draw cycles rather than one for each game. In the first draw cycle at step 635, a predefined first draw of numbers is selected that is less than the total of 20 random numbers that will be used in the game. In a first embodiment of the game as shown in FIGS. 5A-5H, the first draw cycle for primary card 505A is equal to the number of spots the player has chosen to play, which is 10 numbers. The total draw for primary card 505A is predefined for purposes of standard keno games to be 20, so the second draw cycle for primary card 505A is also 10 numbers. It should be understood that the first draw cycle for primary card 505A may be a different number than 10. For example, if the player chose to mark 8 spots instead of 10, the second draw cycle for primary card 505A would select 12 numbers. Given that standard keno uses a total of 20 selected numbers in the draw, the sum of the numbers selected between the two draw cycles for primary card 505A is 20, however, the set of drawn numbers may be another number that may be used to evaluate a final keno card according to a predefined paytable. The decision on how many numbers to use in total and as divided between each of the first and second draw cycles is up to the game designer.

The game of keno is defined in certain jurisdictions, including the state of Nevada as having a minimum draw of 20 numbers with the maximum number of spots to be selected by the player of 10 for all games. It should be understood that the invention as described is intended for use with Nevada style keno game, but the invention is not limited to a draw of 20 with 10 player selected spots and may be applied to any keno game irrespective of the size of the draw and/or the number of player selected spots for play. The present invention seeks to make the game of keno more appealing to the player. In doing so, the player will see an advantage in getting to use any hits from the first draw cycle on primary card 505A in the second draw cycle for secondary cards 505B-D without having the missed numbers from the first draw cycle applied to the secondary play cards.

In the embodiment shown in FIGS. 5A-5H, the first draw cycle for primary card 505A consists of the same number of numbers as the number of player marked spots on primary card 505A. For example, if the player marked ten spots as shown, ten numbers would be drawn in the first drawing cycle. Once the first draw cycle is carried out at step 635 by EGM 100, the ten selected numbers are displayed in FIG. 5C in ball area 510 on display 105 at step 640. As can be seen, there are three hits among the ten numbers drawn in the first drawing cycle 27, 3 and 51. The balls with these numbers are highlighted to show that they are hits on primary card 505A while missed numbers are shown as an "X" on the corresponding spots on game card 505A.

Figure 5D:
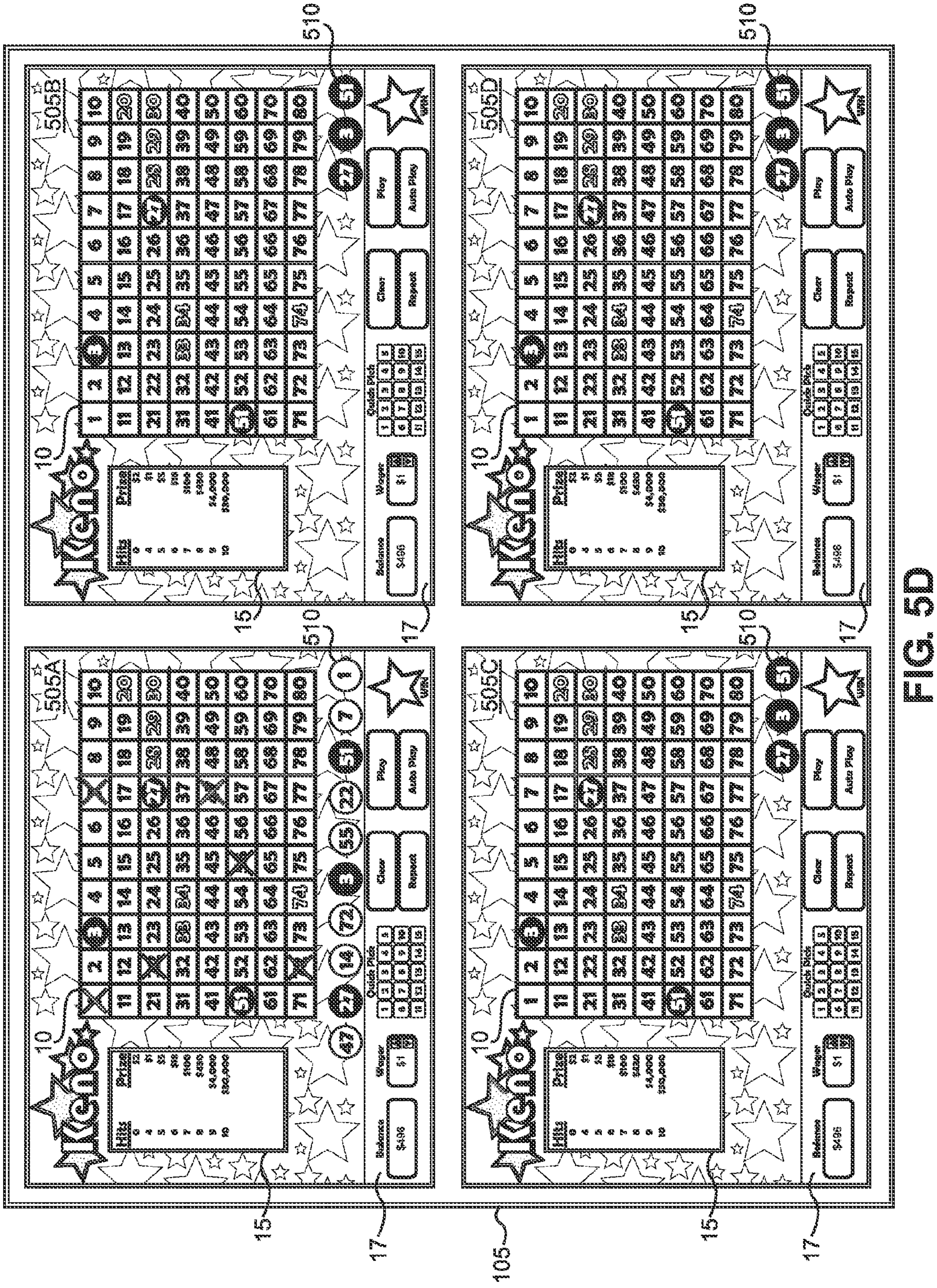

Once the first draw cycle of ten numbers has been completed at step 640, any hits among the ten selected numbers are replicated onto each of the secondary cards 505B-D on which the player has wagered at step 645 as can be seen in FIG. 5D. In the example, the three hits are added to each of the secondary cards 505B-D. Any missed numbers from the first draw cycle on primary card 505A (i.e. 1, 7, 22, 55, 71, 14 and 47) are not carried forward into secondary game cards 505B-D.

Figure 5E:
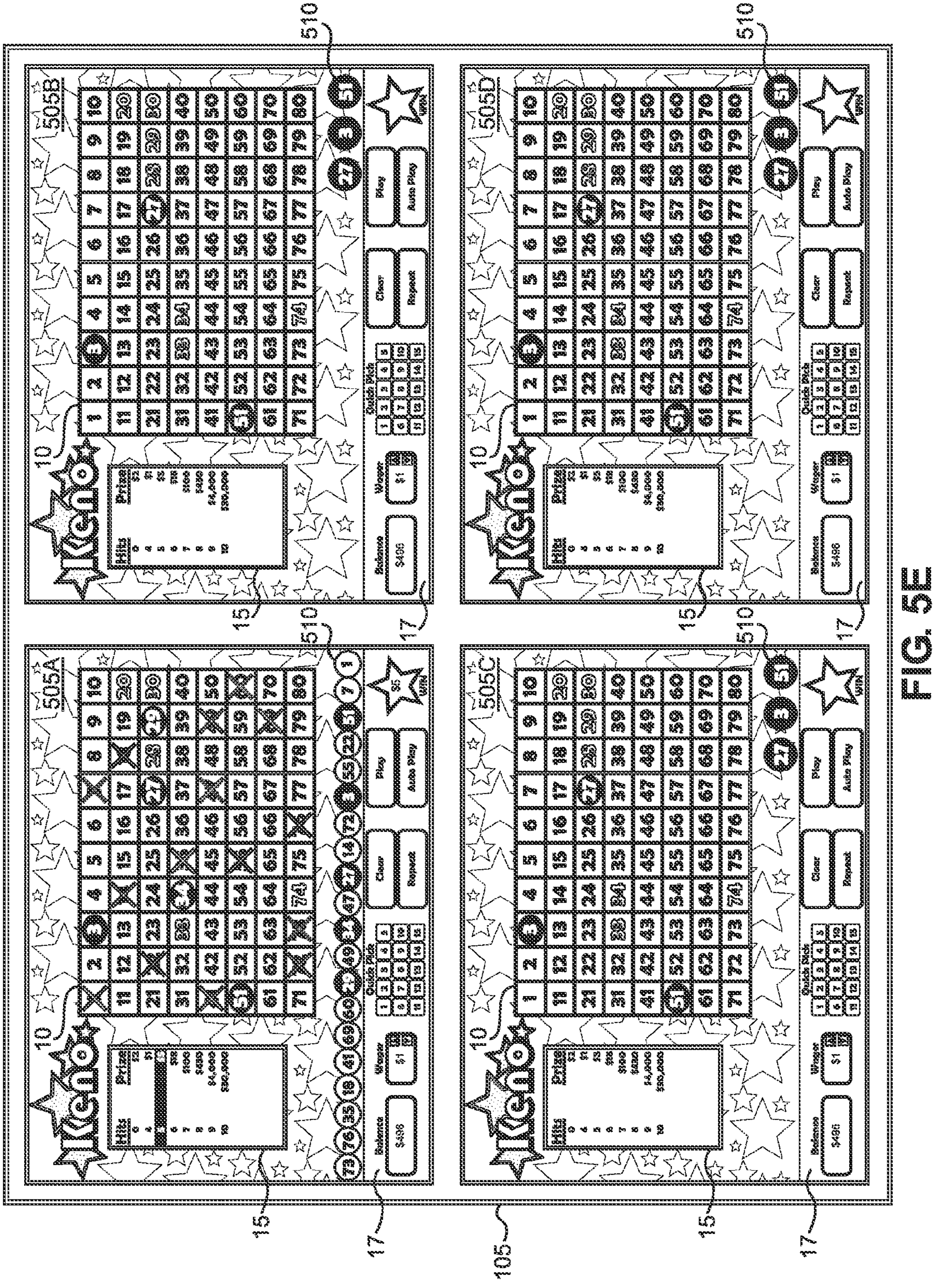

After replicating the hits from the first draw cycle on primary card 505A onto each of secondary cards 505B-D, the second drawing cycle is performed by EGM 100 independently for each of the four game cards 505A-D wagered on by the player. The second draw cycle for primary card 505A is first and is performed at step 650 as a continuation of the first draw cycle. Ten additional numbers are selected at random to reach the total of 20 drawn numbers for primary card 505A. FIG. 5E shows the completion of the second draw cycle for primary card 505A with the remaining 10 numbers drawn totaling 20 numbers. In addition to the three hits from the first draw cycle, an additional two hits have been recorded in the second draw cycle (spots 34 and 29) resulting in a total of five hits for primary card 505A. Card 505A is evaluated at step 655 and the five hits results in the awarding of a prize of $5 to the player at step 660 according to paytable 15 for primary card 505A. The prize may be paid by adding it to the credit meter in information bar 17, or alternatively and as is more typical in EGMs in commercial use, payment of the award is made at the end of the game cycle as a total of the winnings on all game cards after the game cycle has been completed (see step 685). Also, the winning amount, in this case five hits is highlighted in paytable 15 on card 505A.

After completing primary card 505A, play on each of secondary cards 505B-D continues. For each of secondary cards 505B-D, an independent second draw cycle is performed. The second draw cycle may occur sequentially for each secondary card 505B-D, or the independent draw cycles for each secondary card 505B-D may be performed simultaneously. To clearly show the second draw cycle on each of secondary cards 505B-D, screenshots of the draws will be shown sequentially starting with the second draw cycle for secondary card 505B in FIG. 5F.

After indicating a prize is won at step 660 for a win on primary card 505A if required, the process of flowchart 600 continues to step 665 where it is determined whether a first or later secondary card remains in play. If not, the flow returns to the start block 605 where the player may start a new game cycle. If one or more secondary game cards remain in play, the process moves to step 670 where the second draw cycle is performed on the next secondary play card.

Figure 5F:
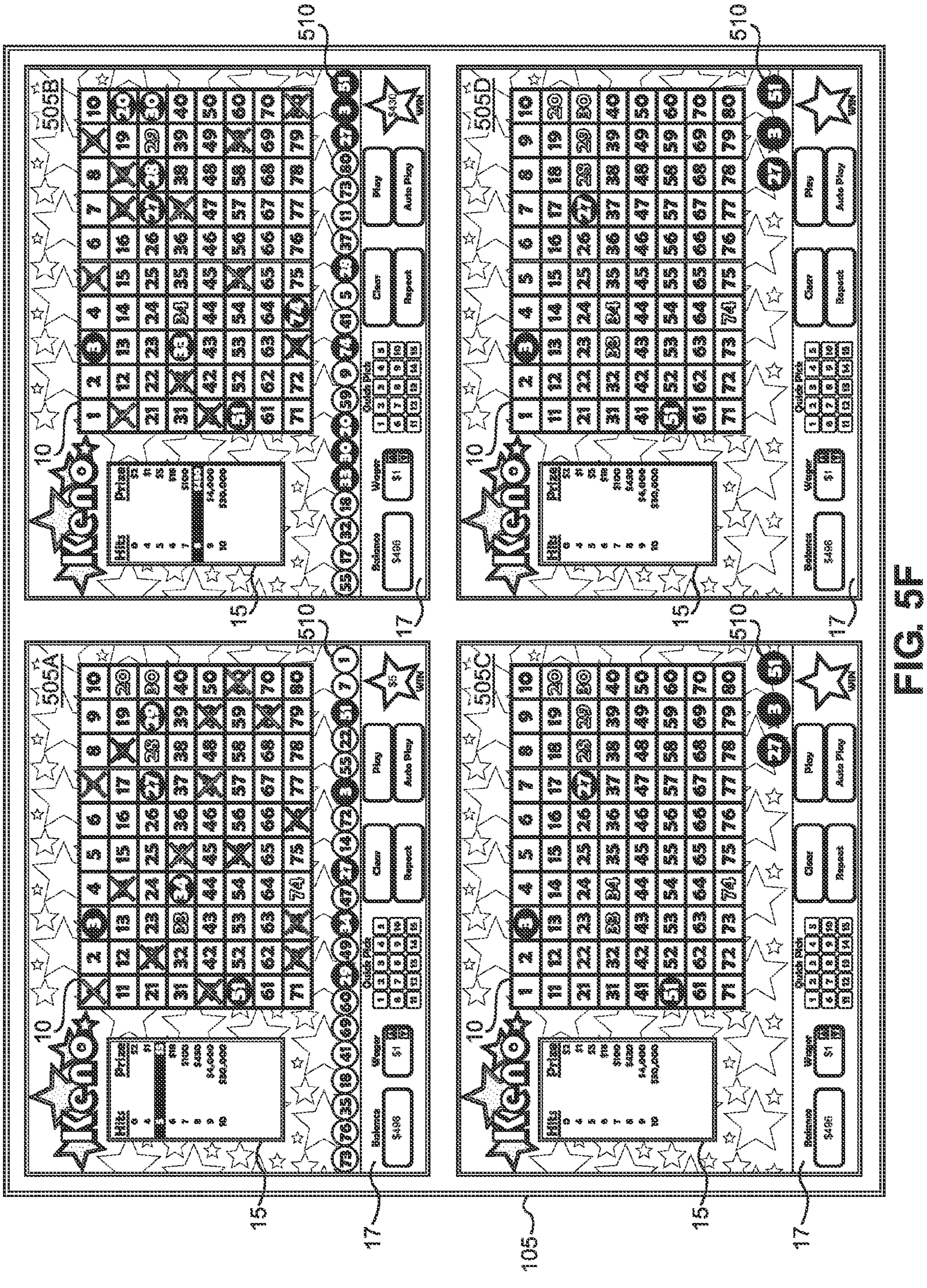
Figure 5G:
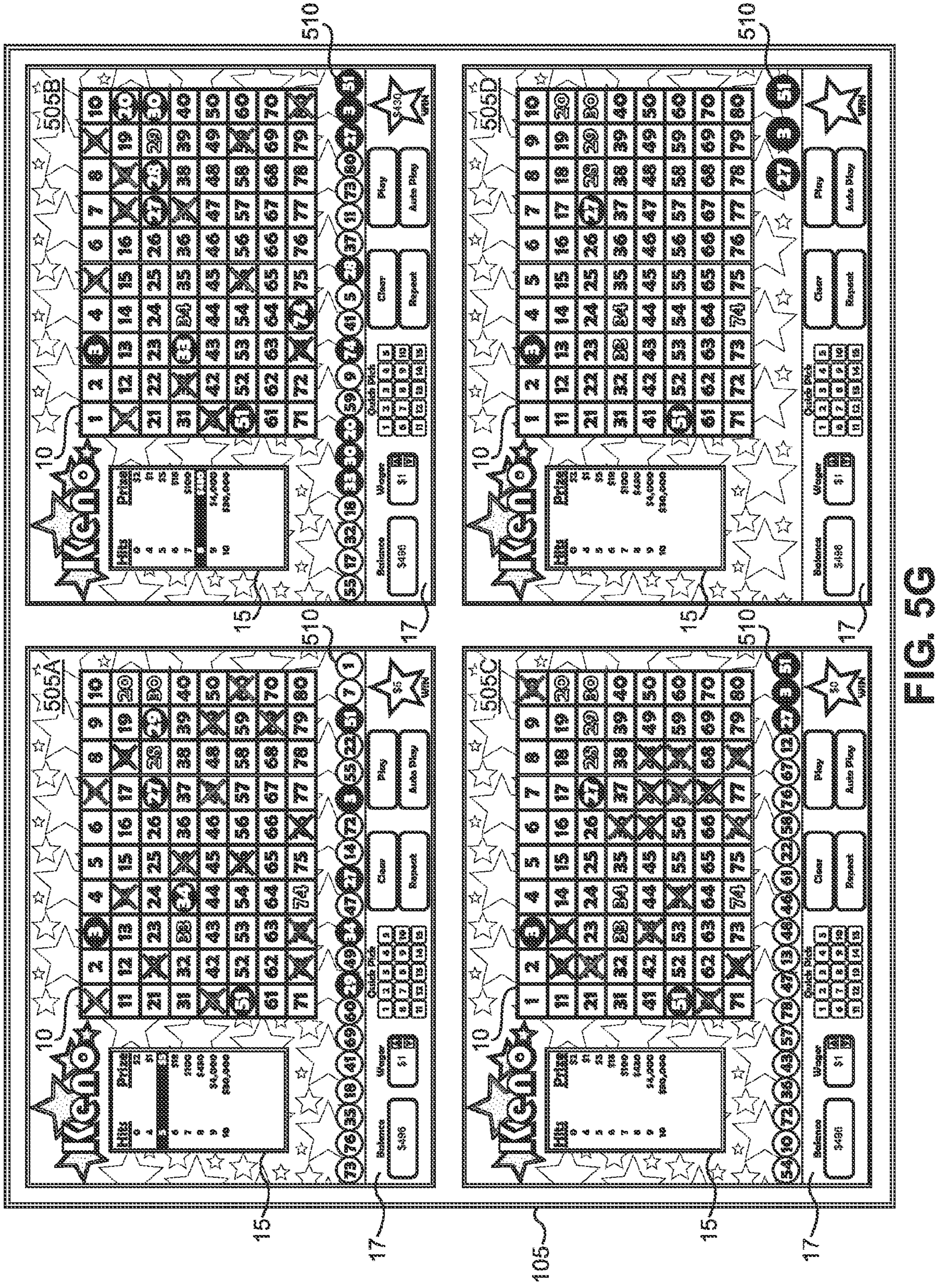
Figure 5H:
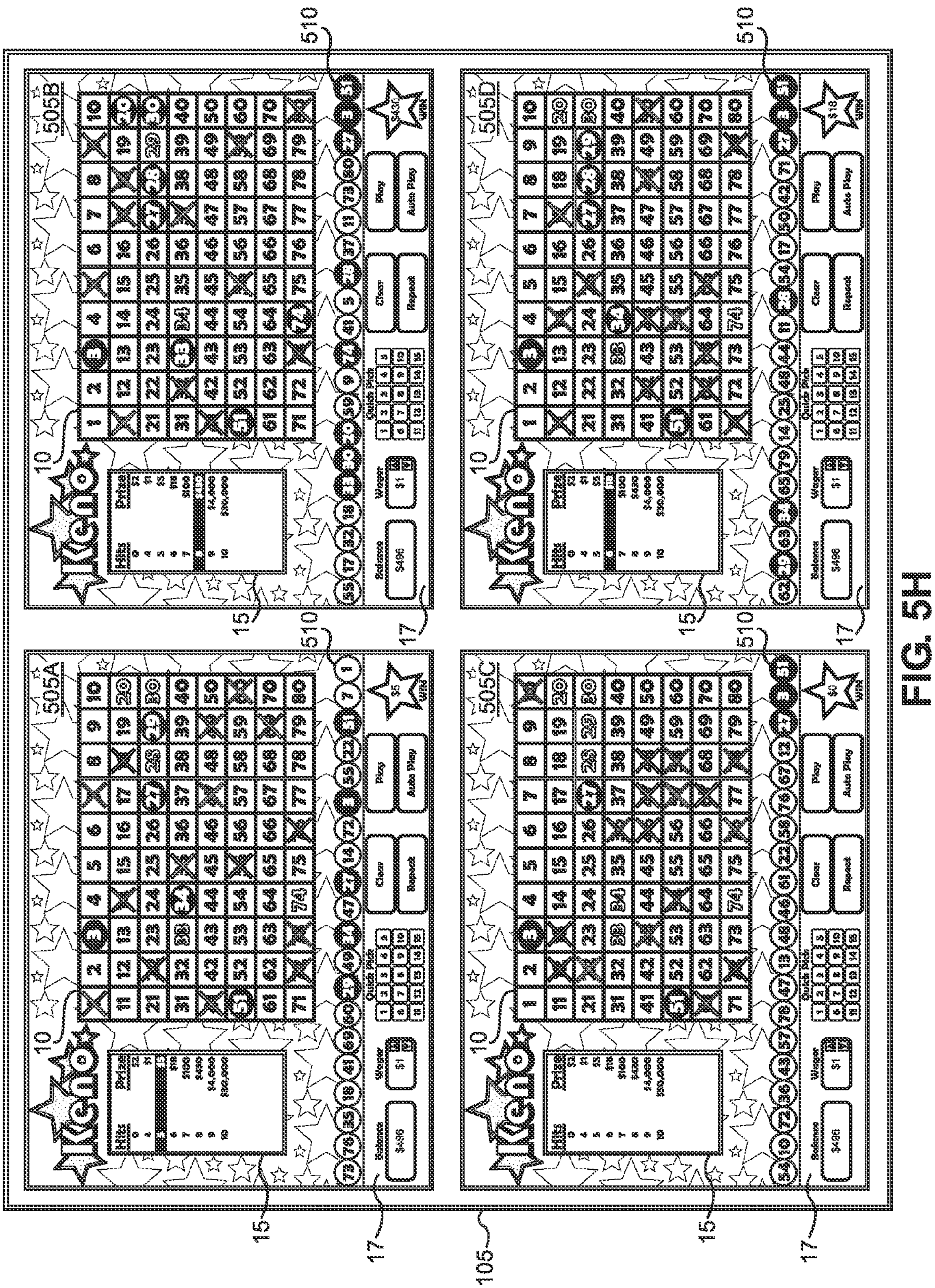
Figure 6:
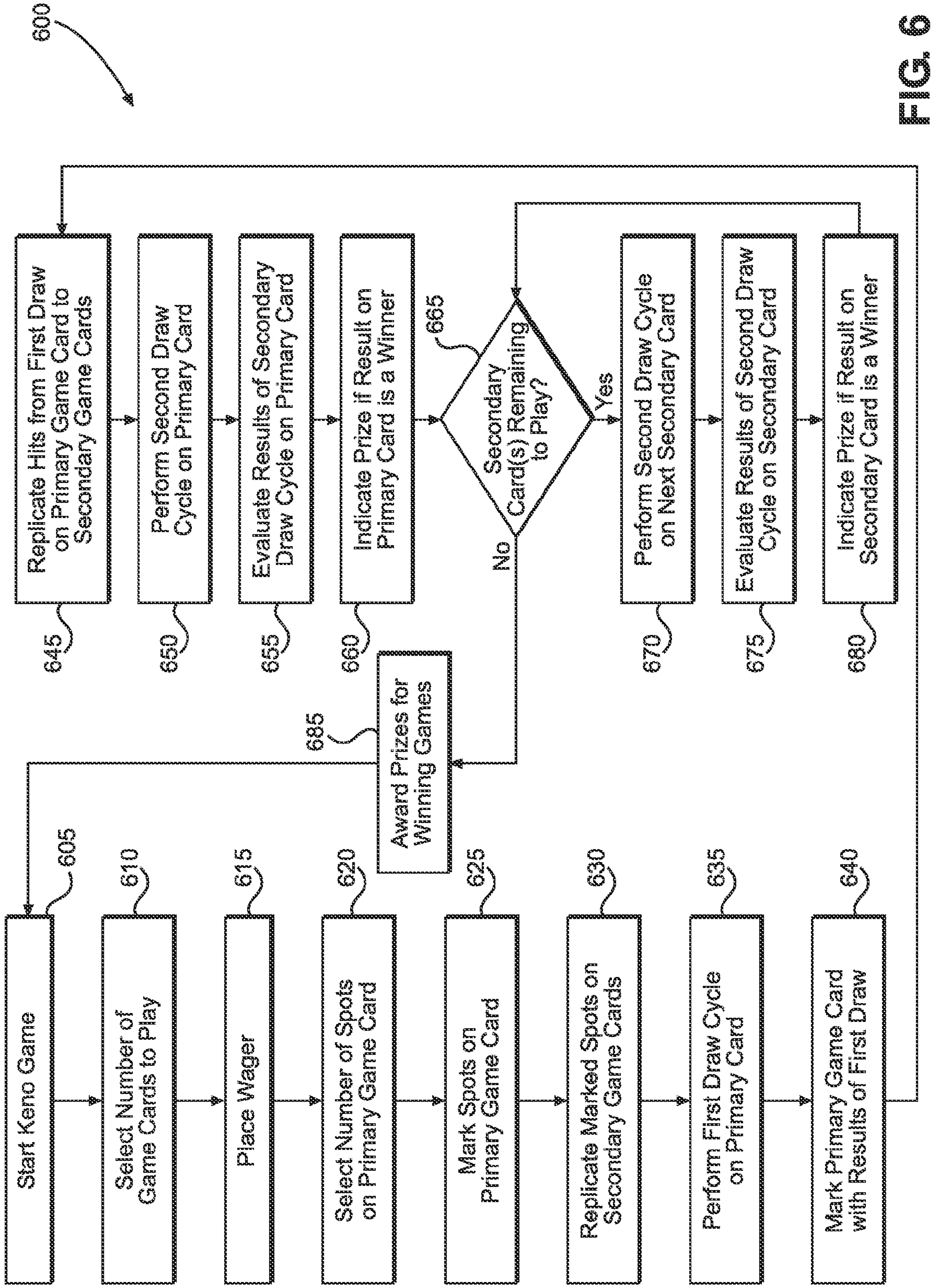
FIG. 6 shows a flow chart of keno game play where selected numbers hit in a first keno play card are replicated into later keno play cards in accordance with the present invention.

The second draw cycle for secondary card 505B is 17 numbers since the number of hits replicated for each secondary card 505B-505D from the first draw cycle for primary card 505A was three, leaving an additional 17 numbers to be drawn from the total of 20. As can be seen in FIG. 5F, the second draw cycle for secondary play card 5058 is performed at step 670. The seventeen numbers randomly selected yields five additional hits (28, 74, 20, 30 and 33). The hits are shown as highlighted balls in the ball area 510 on display 105, and are highlighted on the corresponding marked spots on secondary card 5058. Card 5058 catches eight hits in total (three from the first draw cycle and five from the second draw cycle). This result is evaluated at step 675 and the player is shown that he has won a payout of $430 on a $1 wager at step 680. Also, the winning amount, in this case eight hits is highlighted in paytable 15 on card 505B. There are 12 random numbers selected that are shown in ball area 510 that do not match. Any selected winning numbers that do not match player selected spots are indicated by an "X" on card 505B over the corresponding spot in matrix 10 just as non-hits were displayed for primary card 505A.

Once an award is displayed to the player at step 680, game play returns to step 665 to determine whether there are any additional secondary game cards for which a second draw cycle remains to be performed. If so, the same procedure that was followed for secondary card 505B with a second draw cycle of 17 random numbers is followed to complete secondary cards 505C and 505D. Starting with secondary card 505C, it can be seen in FIG. 5F that for card 505B, three hits (51, 3 and 27) were replicated from the first draw cycle onto secondary card 505C. Moving to FIG. 5G, the second independent draw cycle (step 670) is performed resulting in the selection of 17 random numbers for secondary card 505C. Upon evaluation (step 675), none of the 17 numbers from the second draw cycle is a hit as can be seen on card 505C. Therefore, card 505C catches only three hits, all from the first draw cycle. Card 505C is a losing card since the paytable does not provide a winning payout for a completed card with three hits. No prize is awarded to the player (step 680) and the process moves to the fourth and final secondary play card, 505D. Also, since card 505C is a loser, there is no highlighting in paytable 15 on card 505C.

The same procedure that was followed for secondary cards 505B and 505C with a second draw cycle of 17 random numbers is followed to complete secondary game card 505D. Starting with secondary card 505D, it can be seen in FIG. 5G that after completion of card 505C, three hits (51, 3 and 27) were replicated from the first draw cycle onto secondary card 505D. Moving to FIG. 5H, the second independent draw cycle (step 670) is performed to select 17 random numbers for secondary card 505D. Three of the 17 numbers from the second draw cycle are hits as can be seen on card 505D. Therefore, upon evaluation of the results (step 675), card 505D catches six hits with three hits from the first draw cycle and three hits from the second draw cycle. Card 505D is a winning card since the paytable provides for a winning payout of $18 for a completed card with six hits. Also, the winning amount, in this case six hits is highlighted in paytable 15 on card 505D. The player is shown the individual award amount on card 505D (step 680) and since no further cards remain, the player is paid the sum total of all winning cards to the credit meter on the EGM at step 685 and returned to block 605 to start a new game cycle.

It should be understood that the order of the steps of play is flexible and may be changed as desired by the game designer. For example, instead of replicating hits from primary card 505A to secondary cards 505B-D at step 645 before performing the second draw at step 650, the replication of the winning spots to secondary cards 505B-D may be completed after the secondary draw has been completed (step 650) on primary card 505A (step 655) and a winning result has been indicated to the player (step 660). Also, the replication of marked spots from primary card 505A to secondary cards 505B-D at step 630 may be performed after some or all of the steps on primary card 505A have been performed.

Figure 7:
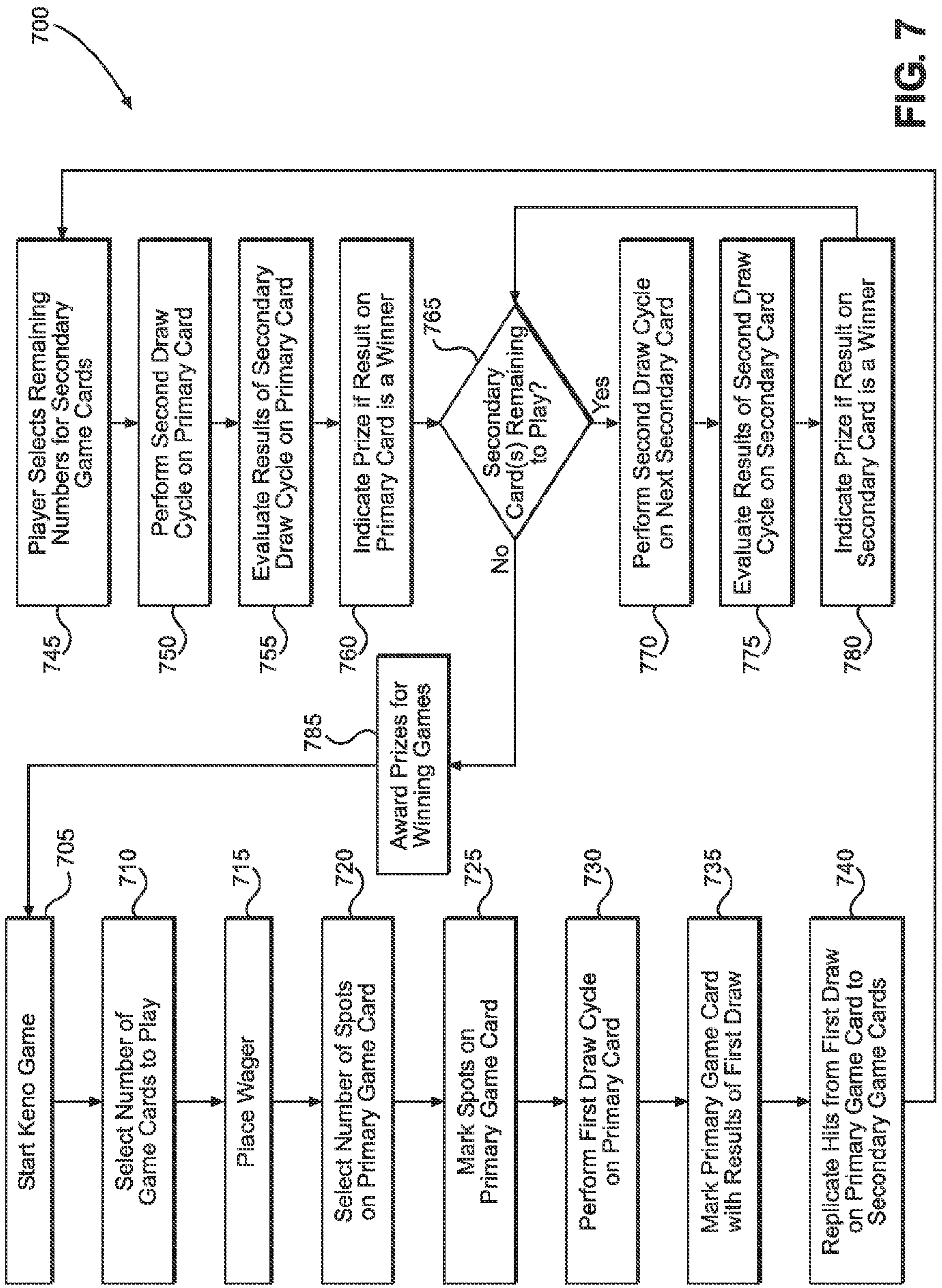
FIG. 7 shows a flow chart of alternative keno game play where selected numbers hit in a first keno play card are replicated into later keno play cards in accordance with the present invention.

In an alternative embodiment of the game shown in flowchart 700 of FIG. 7, the player may select different numbers on the different cards instead of the same set of numbers for all cards to be played. The player starts the game at step 705 and selects the number of game cards to play at step 710. The player then places a wager at step 715 and decides how many numbers to select for play at step 720. In the case of this example, the player will select ten numbers on each of four cards 505A-D just as was done in the example above for flowchart 600.

The player then marks his ten spots at step 725. At this point, Instead of replicating the player marked numbers onto secondary cards 505B-D as was done in the embodiment described with respect to flowchart 600 of FIG. 6, the first draw cycle is performed for primary card 505A at step 730 and any hits are marked on primary card 505A at step 735. Once the first draw cycle is completed for primary card 505A, the hits from the primary card are replicated into the secondary cards 505B-D at step 735 and the hit numbers are marked on matrix 10 of secondary cards 505B-D to show that they are selected and have been hit. The player is then provided an opportunity to mark the remaining numbers for each of the secondary cards 505B-D at step 745. As an example, if there were three hits in the primary draw, those three hits would be replicated into each of the secondary cards 505B-D and seven additional numbers would be made for each secondary game card 505B-D. If there were five hits, those five hits would be replicated into each of the secondary cards 505B-D and five additional number selections would be made for each secondary game card 505B-D. The player may pick the same numbers for each secondary card or different numbers on each card. The player may also use a quick pick option to select the remaining numbers for each secondary card. Once the numbers for the secondary cards 505B-D have been picked, the process follows the same remaining steps (750-785 in FIG. 7) corresponding to those steps of the first embodiment described with respect to flowchart 600 (650-685 in FIG. 6).

While the invention has been described with respect to the figures, it will be appreciated that many modifications and changes may be made by those skilled in the art without departing from the spirit of the invention. For example, while the invention is described with reference to a game sequence involving four game play cards, it is possible to have any number of cards that is two or more where the first card is the primary card and the other cards are secondary cards. It is also at the discretion of the keno game designer to establish predefined values for: (a) the size of the matrix of spots on the game play cards; (b) the range of numbers or spots to be selected for play by a player; (c) the number of spots to be drawn in the first draw cycle; (d) the number of spots to be drawn in the second draw cycle for the primary and secondary play cards; (e) the theoretical payback percentages for payouts to players and the paytable values; (f) the order of the steps in the play sequence; and (g) any other game parameters. Any variation and derivation from the above description and drawings are included in the scope of the present invention as defined by the claims.

What is claimed is:

1. An electronic gaming machine ("EGM") on which a player plays a keno game, comprising:

a controller for controlling operations on the EGM;

a bill validator for receiving an instrument of value, wherein the value is posted in a number of credits to the EGM that may be wagered by the player;

a random number generator that generates random numbers used by the controller to determine winning numbers during play of the keno game;

a display in communication with the controller for displaying information to the player including a representation of at least two game cards including a first card and at least one secondary card to the player on which the game is conducted wherein each game card comprises a pool of numbers within a predefined range;

an interface in communication with the controller through which the player inputs information to the EGM including one or more marks designating a player selected number of spots on the first card to indicate a selected group of numbers from the pool of numbers wherein the spots marked on the first card are replicated on the at least one secondary card;

a payout component in communication with the controller that makes a payout to a player upon achieving a winning outcome on one or more of the game cards;

wherein the controller performs operations comprising:

(a) accepting a wager;

(b) performing a first draw using the random number generator to generate a first random group of numbers that are converted to a first subset of numbers that are within the predefined range of the pool of numbers;

(c) indicating to the player on the display zero or more first draw hits between the first subset of numbers generated by the first draw and the selected group of numbers on the first card;

(d) replicating spots hit on the first card to corresponding spots on the at least one secondary card;

(e) performing a second draw using the random number generator for the first card to generate a second random group of numbers that are converted to a second subset of numbers for the first card that are within the predefined range of the pool of numbers and that are different from the first subset of numbers;

(f) indicating to the player on the display zero or more second hits between the second subset of numbers generated by the second draw and the selected group of numbers on the first card;

(g) evaluating results of the first card based on the total hit count that is the sum of the zero or more first hits and the zero or more second hits on the first card;

(h) performing a separate second draw using the random number generator for each secondary card to generate a second subset of numbers for each secondary card that is within the predefined range of the pool of numbers and that is different from the first subset of numbers and independent of the second subset of numbers for the first card;

(i) indicating to the player on the display zero or more second hits between the second subset of numbers generated by the second draw and the selected group of numbers on each secondary card;

(j) evaluating results of each secondary card based on the total hit count that is the sum of the zero or more first hits and the zero or more second hits on each secondary card;

(k) paying the player an award from the payout component upon achieving a winning number of total hits on the first card; and (l) paying the player an award from the payout component upon achieving a winning number of total hits on each secondary card.

2. The system of claim 1 wherein the interface is a touchscreen.

3. The system of claim 1 further comprising a quick pick selector that upon activation automatically marks the player determined number of spots on the first card to indicate the selected group of numbers from the pool of numbers is performed.

4. The system of claim 1 wherein the first subset of numbers and the second subset of numbers that are within the predefined range of the pool of numbers are displayed on the display one at a time to the player as an icon.

5. The system of claim 1 wherein when a hit is recorded, the number on the cards associated with a hit is indicated on the display.

6. The system of claim 1 wherein the numbers in the first subset of numbers or the second set of numbers that are not hits are indicated on the cards.

7. The system of claim 1 wherein the EGM is of the type used in a casino or other gaming establishment.

8. The system of claim 1 wherein steps (c), (g), (h), (i) and (k) are performed for at least one additional second card during the game.

9. The system of claim 8 wherein the results of the secondary draws for the at least one additional second card are shown simultaneously on the display.

10. The system of claim 1 wherein information is displayed to the player for each game from among the group comprising: (a) a paytable; (b) a credit meter; (c) an auto pick selector; (d) a play selector; (e) a win meter; (f) wager amount; (g) a repeat selector; (h) a clear selector; and/or (i) an auto-play selector.

11. A method by which a player plays a keno game on an electronic gaming machine ("EGM") having a display and a user interface through which the player interacts with the EGM, comprising:

(a) receiving an instrument of value in a bill validator, wherein the value is posted in a number of credits that may be wagered by the player on the EGM;

(b) accepting a wager;

(c) displaying at least two game cards to the player on which the game is conducted wherein each game card comprises a pool of numbers within a predefined range;

(d) marking a player determined number of spots on a first card to indicate a selected group of numbers from the pool of numbers;

(e) replicating the spots marked on the first card to corresponding spots on a second card;

(f) performing a first draw to generate a first subset of numbers that are within the predefined range of the pool of numbers;

(g) indicating to the player zero or more first draw hits between the first subset of numbers generated by the first draw and the selected group of numbers on the first card;

(h) replicating the zero or more first draw hits from the first card to the second card;

(i) performing a second draw for the first card to generate a second subset of numbers for the first card that are within the predefined range of the pool of numbers and that are different from the first subset of numbers;

(j) indicating to the player zero or more second hits between the second subset of numbers generated by the second draw and the selected group of numbers on the first card;

(k) evaluating results of the first card based on the total hit count that is the sum of the zero or more first hits and the zero or more second hits on the first card;

(l) performing a second draw for the second card to generate a second subset of numbers for the second card that are within the predefined range of the pool of numbers and that are different from the first subset of numbers and independent of the second subset of numbers for the first card;

(m) indicating to the player zero or more second hits between the second subset of numbers generated by the second draw and the selected group of numbers on the second card;

(n) evaluating results of the second card based on the total hit count that is the sum of the zero or more first hits and the zero or more second hits on the second card;

(o) paying the player an award for a winning number of total hits on the first card; and (p) paying the player an award for a winning number of total hits on the second card.

12. The method of claim 11 wherein the keno game is played on an electronic gaming machine having a touch-screen.

13. The method of claim 11 further comprising marking the player determined number of spots on the first card to indicate the selected group of numbers from the pool of numbers is performed using a quick pick.

14. The method of claim 11 wherein the first subset of numbers and the second subset of numbers that are within the predefined range of the pool of numbers are displayed one at a time to the player as an icon on the display.

15. The method of claim 11 wherein when a hit is recorded, the number on the cards associated with a hit is indicated on the display.

16. The method of claim 11 wherein the numbers in the first subset of numbers or the second set of numbers that are not hits are indicated on the cards.

17. The method of claim 11 wherein the keno game is played on an EGM of the type used in a casino or other gaming establishment.

18. The method of claim 11 wherein steps (e), (h), (i), (m), (n) and (p) are performed for at least one additional second card during the game.

19. The method of claim 18 wherein the results of the secondary draws for the at least one additional second card are shown simultaneously on the display.

20. The method of claim 11 wherein information is displayed to the player for each game from among the group comprising: (a) a paytable; (b) a credit meter; (c) an auto pick selector; (d) a play selector; (e) a win meter; (f) wager amount; (g) a repeat selector; (h) a clear selector; and/or (i) an auto-play selector.

21. A method by which a player plays a keno game on an electronic gaming machine ("EGM") having a display and a user interface through which the player interacts with the EGM, comprising:

(a) receiving an instrument of value in a bill validator, wherein the value is posted in a number of credits that may be wagered by the player on the EGM;

(b) accepting a wager;

(c) displaying at least two game cards to the player on which the game is conducted wherein each game card comprises a pool of numbers within a predefined range;

(d) marking a player determined number of spots on a first card to indicate a selected group of numbers from the pool of numbers;

(e) performing a first draw to generate a first subset of numbers that are within the predefined range of the pool of numbers;

indicating to the player zero or more first draw hits between the first subset of numbers generated by the first draw and the selected group of numbers on the first card;

(f) replicating the zero or more first draw hits from the first card to a second card;

(g) performing a second draw for the first card to generate a second subset of numbers for the first card that are within the predefined range of the pool of numbers and that are different from the first subset of numbers;

(h) indicating to the player zero or more second hits between the second subset of numbers generated by the second draw and the selected group of numbers on the first card;

(i) evaluating results of the first card based on the total hit count that is the sum of the zero or more first hits and the zero or more second hits on the first card;

(j) marking a number of spots on the second card equal to the player determined number of spots less the number of first draw hits;

(k) performing a second draw for the second card to generate a second subset of numbers for the second card that are within the predefined range of the pool of numbers and that are different from the first subset of numbers and independent of the second subset of numbers for the first card;

(l) indicating to the player zero or more second hits between the second subset of numbers generated by the second draw and the selected group of numbers on the second card;

(m) evaluating results of the second card based on the total hit count that is the sum of the zero or more first hits and the zero or more second hits on the second card;

(n) paying the player an award for a winning number of total hits on the first card; and (o) paying the player an award for a winning number of total hits on the second card.

* * * * *